US006965777B1

(12) United States Patent
Cast et al.

(10) Patent No.: US 6,965,777 B1
(45) Date of Patent: Nov. 15, 2005

(54) METHOD OF DELIVERING SHORT MESSAGES USING A SMPP GATEWAY WITH STANDARD INTERFACE

(76) Inventors: Thomas Cast, 17700 NE. 136th St., Redmond, King County, WA (US) 98033; David Midkiff, 8105 NE. 128th St., Kirkland, King County, WA (US) 98034

( * ) Notice: Subject to any disclaimer, the term of this patent is extended or adjusted under 35 U.S.C. 154(b) by 377 days.

(21) Appl. No.: 09/714,035

(22) Filed: Nov. 16, 2000

(51) Int. Cl.$^7$ .............................................. H04Q 7/20
(52) U.S. Cl. ................ 455/466; 455/412.1; 455/414.1; 370/237; 370/352
(58) Field of Search ............................... 455/445, 412, 455/414, 422, 432, 466, 560; 370/229, 237, 370/310, 351, 352, 428

(56) References Cited

U.S. PATENT DOCUMENTS

| | | | | |
|---|---|---|---|---|
| 5,463,620 A | * | 10/1995 | Sriram | 370/412 |
| 5,579,372 A | * | 11/1996 | Astrom | 455/412 |
| 5,635,918 A | * | 6/1997 | Tett | 340/7.29 |
| 5,822,700 A | * | 10/1998 | Hult et al. | 455/466 |
| 5,946,299 A | * | 8/1999 | Blonder | 370/237 |
| 5,966,663 A | * | 10/1999 | Gleason | 455/466 |
| 5,970,059 A | * | 10/1999 | Ahopelto et al. | 370/338 |
| 6,263,212 B1 | * | 7/2001 | Ross et al. | 455/466 |
| 6,289,212 B1 | * | 9/2001 | Stein et al. | 455/412 |
| 6,421,709 B1 | * | 7/2002 | McCormick et al. | 709/206 |
| 6,434,396 B1 | * | 8/2002 | Rune | 455/502 |
| 6,459,904 B1 | * | 10/2002 | Lorello et al. | 455/466 |
| 6,473,399 B1 | * | 10/2002 | Johansson et al. | 370/229 |

\* cited by examiner

Primary Examiner—Stephen D'Agosta
(74) Attorney, Agent, or Firm—Ipsolon llp

(57) ABSTRACT

A method is disclosed for delivering a short message from an external short message entity (ESME) to a wireless device. The method comprises transmitting a message from a message source device such as an external short message entity to a gateway, the message being associated with a service type. A routing determination is made based on the service type associated with the message. The message is then routed to one of a plurality of message centers according to the routing method chosen. The method may be used with a gateway system that implements a standard interface to a message complex of a wireless system. The interface enables all ESMEs to communicate with the message complex using a consistent standard interface. The system used to implement the method of the present invention comprises a short message point-to-point gateway, a message complex, a home location register and a mobile switching center. The external short message entity connects to the short message point-to-point gateway and requests delivery of a message to a wireless device, and the short message point-to-point gateway routes the request to an appropriate message center.

20 Claims, 17 Drawing Sheets

METHOD OF DELIVERING SHORT MESSAGES USING A SMPP GATEWAY WITH STANDARD INTERFACE

CROSS-REFERENCE TO RELATED APPLICATIONS

The present application is related to U.S. Application Ser. No. 09/714,036, entitled "A SHORT MESSAGE POINT-TO-POINT GATEWAY HAVING A STANDARD INTERFACE", application Ser. No. 09/714,034, entitled "A SYSTEM AND METHOD OF BINDING TO A SHORT MESSAGE POINT-TO-POINT PROTOCOL GATEWAY", application Ser. No. 09/714,033, entitled "A SYSTEM AND METHOD FOR PERFORMING ANTI-SPAM CONTROL USING A SHORT MESSAGE POINT-TO-POINT PROTOCOL GATEWAY", application Ser. No. 09/714,032, entitled "A SYSTEM AND METHOD FOR PERFORMING THROTTLE CONTROL IN A SHORT MESSAGE POINT-TO-POINT PROTOCOL GATEWAY", and application Ser. No. 09/714,031, entitled "A SYSTEM AND METHOD FOR PERFORMING THROTTLE CONTROL IN A SHORT MESSAGING POINT-TO-POINT PROTOCOL GATEWAY". Each of these applications is concurrently filed and commonly owned. The contents of each of these applications are incorporated herein by reference.

BACKGROUND OF THE INVENTION

1. Field of the Invention

The present invention relates to a gateway for allowing message sources to deliver messages to wireless devices and, more specifically, to a method of delivering short messages using a short message point-to-point protocol gateway that routes messages to wireless devices according to a single logical interface.

2. Discussion of Related Art

Wireless devices such as mobile telephones and the like can transmit and receive short messages from a variety of different sources. One example of a source of a short message destined for a wireless device is a short message entity (SME). Examples of such short message entities include computers, interactive voice response systems (IVR), teleservice servers, and intelligent peripherals. Examples of short messages that may be sent include voice mail and email. A device operating as a message source external to a wireless network is commonly called an external short message entity (ESME). Typically, and in the context of this disclosure, an ESME is a device associated with a wired network that operates as a message source delivering a message to a mobile device. ESME messages destined for mobile devices are called herein mobile terminated (MT) messages since they originate from a wired ESME device and terminate with a mobile device. The following discussion relates primarily to MT messages.

In addition to operating as the source for a short message, ESMEs may also receive short messages from other devices, such as mobile devices. In this regard, messages originating from mobile devices are referred to herein as mobile originating (MO) messages.

A basic protocol for delivering messages from a wired network using a teleservice server to a wireless or mobile device is called the short message peer-to-peer (or point-to-point) protocol (SMPP). In addition to this basic protocol that may be used for a variety of ESMEs, the exact message flows from the ESME to the mobile device varies for each teleservice provider. A basic network architecture by which a message is delivered from a message source to a message-receiving device is shown in FIG. 1. As discussed below, numerous logical interfaces are presently necessary between an ESME and a wireless network in order to send and receive short messages. The different logical interfaces are necessary because numerous teleservices associated with ESMEs require different protocols for interfacing their ESME with routers in order to deliver the messages.

The architecture shown in FIG. 1 illustrates a system for delivering short messages from an ESME to a wireless network device. An external short messaging entity 108, 110, 112, 114 or 102 is the source of a short message. Examples of an ESME include a telephone, cellular phone, computer connecting through the Internet 106 to a network, or the like. A plurality of message or messaging centers $124_1$–$124_x$ (MCs) each receives messages from one of the ESMEs. Since there are many different protocols for communicating short messages to the messaging centers, each messaging center can only receive messages sent by ESMEs 102 delivering messages according to a known protocol for that messaging center. If the destination of the ESME 102 message is a wireless device, the MCs $124_1$–$124_x$ transmit the short messages to a wireless network having network nodes and network switching centers 128, 130. The wireless network includes a home location register 126, a mobile mobile switching center 132 and antennas in order to deliver the message using an over-the-air interface. The mobile receiving device, or wireless device 136, receives and displays the intended message to a user.

As the demand for messaging services increases, the number of messages delivered by message centers will also increase. The increased demand poses difficulties in scaling the message complex to handle numerous ESME 102 requests. Furthermore, non-standard ESMEs or ESMEs that do not recognize a messaging protocol for a phone number or pager number may be intended destinations or message sources for a message. This increases the complexity of the network requirements for delivering messages.

Having discussed MT messaging, we now turn to a discussion of messages that originate from a mobile device. These are referred to herein as mobile originated (MO) messages. Delivering MO messages, like MT messages, suffers from the probem discussed above wherein numerous interfaces are necessary for the variety of protocols used for the numerous teleservices. MO messages are transmitted from the mobile device through the wireless network to an MC $124_1$–$124_x$. However, each mobile device transmits messages to its associated MC $124_1$–$124_x$, wherein routing tables or a translation process are needed to route the message in the direction of the destination ESME. Many different messaging interfaces are necessary for transmitting the message from the MC $124_1$–$124_x$ to an ESME 102.

SUMMARY OF THE INVENTION

What is needed in the art is a single logical interface to the messaging complex. The single logical interface to the messaging complex according to the present invention is called a short messaging point-to-point (SMPP) gateway (SG) and will provide one consistent interface for ESMEs to request delivery of service. ESMEs will also be isolated from any knowledge of the underlying messaging complex or wireless network implementation. With this implementation of a standard interface, non-standard ESME's may be allowed to connect to a messaging complex and transmit short messages.

In order to address the needs in the art, the invention disclosed herein provides a single logical interface for all SMPP messages going to and from the Messaging Complex and eliminates the need for ESMEs to have any implementation knowledge of the Messaging Complex or wireless network. The invention provides routing from an ESME to the destination MC based on service being delivered and provides MC reconfiguration capability that does not require reconfiguration of ESMEs. The present invention also provides efficient scaling in the SG as traffic increases and achieves minimal delay in message delivery. The SG routing system minimizes or eliminates the modification of any parameters in SMPP messages and is configurable to support all SMPP message types.

In order to achieve the advantages of the present invention, the following system is proposed. To enable an ESME to submit messages for delivery to a wireless device. The first embodiment of the invention relates to mobile terminated (MT) messages. The system involves implementing an external interface to the messaging complex and enables all ESMEs to communicate with the messaging complex using a consistent standard interface.

According to a preferred embodiment of the present invention, a system for allowing an external short message entity to submit a message to be delivered to a message-receiving device in a wireless network comprises an SG communicating with a plurality of messaging centers and communicating with a plurality of ESMEs. The ESME connects or "binds" to the SG and requests delivery of a message to a wireless device. The SG routes the request to an appropriate messaging center. The SG is configured such that any external short messaging entity need only to have knowledge of a single protocol for requesting delivery of messages from the SG.

The ESME also connects to the SG by submitting a bind request signal including a system identification, password and system type. The SG responds to the bind request with a bind response signal including a system identifier and an error message if a bind is not successful. If a bind is not successful, the bind response signal includes an error signal indicating why the bind was not successful.

An important feature of the invention is that the SG determines the routing method based on a service type. The SG communicates with a plurality of messaging centers and determines the routing method to a destination message center according to the service type. The routing method may be one chosen from a group comprising: message center specific, load balancing, MDN range, equal allocation, and ESN. Other routing methods may also be added, such as inter-carrier routing and multi-network routing methods. Accordingly, such routing methods for delivery of messages between different carriers and across different network technologies may also be within the scope of the present invention. These routing methods apply to both MO and MT messages.

The method according to the present invention enables an ESME to submit messages to be delivered to a wireless device. The method comprises requesting delivery of a service to a wireless device from an SG, routing the request to a message center according to a service type and a routing method, and delivering the request to a wireless network.

Another embodiment of the invention comprises a system for transmitting short messages from a mobile station to an ESME. These are the so-called MO messages. This embodiment of the invention comprises a system for allowing a message source to submit a message to be delivered to a message-receiving device. The system comprises a short messaging point-to-point gateway communicating with a plurality of messaging centers. The messaging centers communicate with a wireless network associated with the message-originating source. The message source transmits the message to one of the plurality of messaging centers, and the one of the plurality of messaging centers requests from the SG delivery of a message to the message-receiving device. The SG routes the request to the messaging receiving device. The SG determines a routing method based on a service type. The short messaging point-to-point gateway is configured to inquire whether anti-spamming is enabled according to a service type. An anti-spam check of MT or MO messages is an attribute of the service type defined at the SG.

According to the embodiment of the invention related to MO messages, the message source connects to the one of the plurality of messaging centers by submitting a short message containing teleservice ID (TID), bearer data, source address and destination address. One of the plurality of messaging centers transmits a delivery short message signal to the SG. The SG determines a routing method based on a service type, cindluign ESME-specific, load balancing, equal allocation, destination IP address, and destination address.

BRIEF DESCRIPTION OF THE DRAWINGS

The various embodiments of the invention may be understood with reference to the attached drawings, of which.

DETAILED DESCRIPTION OF THE INVENTION

The first embodiment of the present invention comprises a system architecture for allowing external sources to connect using the short message point-to-point (SMPP) protocol and request delivery of short messages to wireless subscribers. In the context of this disclosure, an SMPP Router (SR) and SMPP Gateway (SG) may be considered the same apparatus. An overview of the system may be understood with reference to FIG. 2. In this disclosure, since a messaging complex and message center both may be shortened to "MC", typically a message center will be shortened herein to "MC" to reduce any confusion. Message complexes are referred to using the full name.

Figure 1:
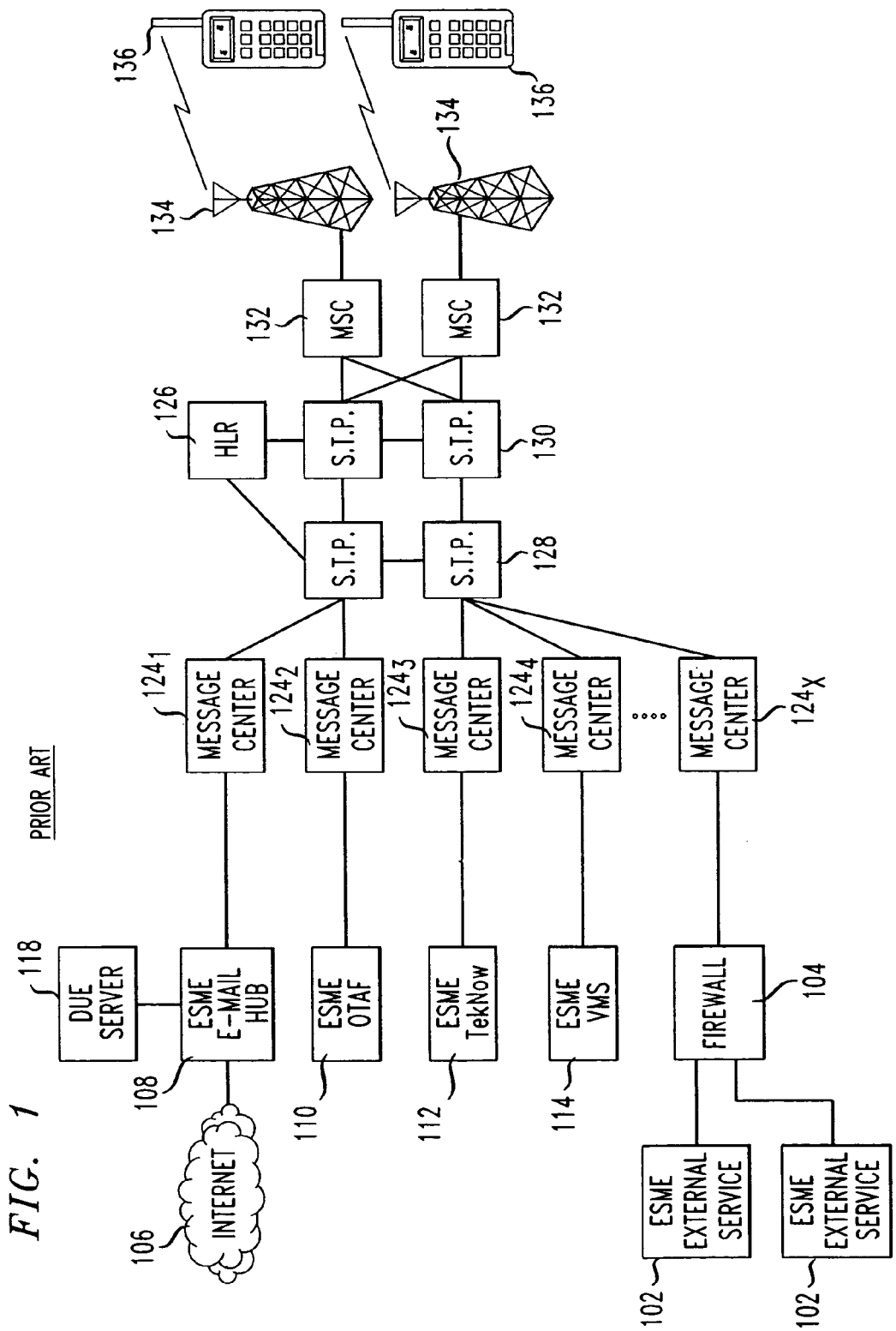
FIG. 1 shows a diagram illustrating the prior art architecture for delivering short messages through a messaging complex.
Figure 2:
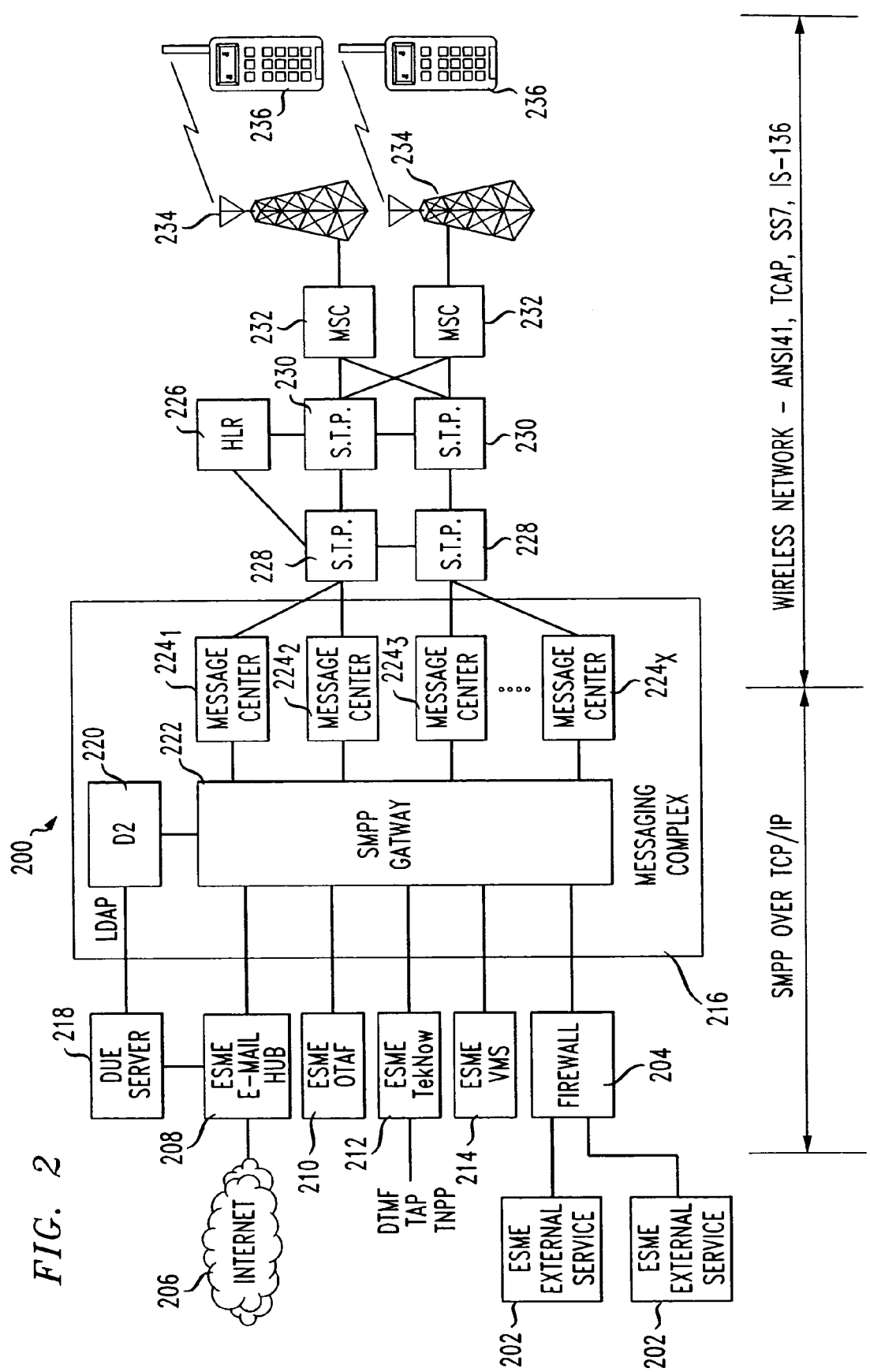
FIG. 2 illustrates the architecture of the system according to the first embodiment of the present invention.

As shown in FIG. 2, the system architecture 200 comprises at least one External Source of a Message Entity (ESME) 202. Each ESME is connected via a firewall 204 to a message complex 216, described in more detail below. Messages may also come from the Internet 206 via an ESME email hub 208. Other sources of ESMEs include an ESME Over-The-Air Activation Facility—OTAF 210, an ESME paging system such as the Teknow system 212 using Dual Tone Multi-Frequency (DTMF), Telocator Alphanumeric Paging Protocol (TAP), or TNPP protocols, or an ESME Voice Mail System (VMS) 214. The Teknow system 212 is a paging system that receives paging requests and forwards the request to the message center for delivery using the TNPP protocol. The Teknow interface may also use other protocols for delivery, such as SMPP or DTMF for tone encoding. The Comverse system 214 is a voice mail system that forwards voice mail waiting notifications to a gateway. Examples of the kinds of messages that may be sent from an ESME include weather reports, stock quotes and the like. The overall system according to the present invention may also be called an "SMPP Receivership."

The SMPP Receivership 200 relies on implementing an external interface to the messaging complex 216. The messaging complex 216 comprises a plurality of messaging centers $224_1$–$224_x$. The subscripts "1" through "x" with respect to the messaging centers indicates that there may be only one messaging center in the message complex 216 or as many as "x" messaging centers in the message complex 216. The interface uses SMPP over TCP/IP and allows all ESMEs 202 to communicate with the messaging complex 216 using a consistent standard interface. To accomplish this task, a SMPP Gateway (SG) 222 is introduced into the messaging complex 216 architecture. The ESMEs 202 know only about the SG 222 and have no knowledge of the underlying implementation of the messaging complex 216 or wireless network. Requiring ESMEs 202 to know only about the SG 222 eliminates the need for the message complex 216 to maintain knowledge of the underlying implementation or characteristics of the ESMEs 202.

The SG 222 receives a message delivery request and routes the message, based on service type and routing methods, to the appropriate message center MC $224_1$–$224_x$ for delivery to a wireless subscriber 236 in the wireless network. The wireless network includes a home location register 226, mobile switching center 232, base stations 234, and other standard wireless nodes 228 and 230. These nodes 228, 230 may be, for example, a mobile switching center, home location register, a mobile station and the like. The SMPP Receiver 200 does not communicate directly with these nodes.

One kind of message that may be transmitted through the SMPP Receiver 200 is a mobile terminated (MT) message. An MT message originates at an ESME 202 and is meant to be delivered to a wireless service subscriber or a wireless device 236. To achieve deliverance of a MT message, an ESME 202 connects to the SG 222 and requests delivery of a specific service to a specific wireless device or mobile station 236. The SG 222 routes the request to the appropriate MC $224_1$–$224_x$ for subsequent delivery in the wireless network. The SG 222 maintains service to MC $224_1$–$224_x$ relationships and routing rules. Responses from the MC $224_1$–$224_x$ are sent to the SG 222 and subsequently to the ESME 202.

Another type of message that may be transmitted on the system 200 includes a mobile originated (MO) message or service. This type of message originates with a mobile device 236 to be delivered to an ESME 202. For MO services, the SG 222 routes the message received from the MC $224_1$–$224_x$ to an ESME 202. The SG 222 maintains service to ESME 202 relationships and routing rules. Responses from the ESME 202 are sent to the SG 222 and subsequently to the MC $224_1$–$224_x$.

In addition to routing messages, spam control is desirable in the SMPP Receivor 200. The network element D2 220 is an enhanced version of a Detection of Undesirable E-mail (DUE) processor 218 that the SG 222 queries for spam control. The D2 220 may be a separate server or a module running on the DUE 218 or on the SG 222. The D2 220 is an enhanced spam control server or processor separate from the undesirable message detection server (DUE) 218. If the D2 220 is implemented as a separate server, then the functionality described herein is implemented according to hardware elements common to servers, such as a processor, memory, interface controls, etc. These elements are known to those of skill in the art and do not need to be further discussed herein.

According to the present invention, the standard DUE capability, for example from a DUE server 218, is enhanced to support queries from the SG 222. For MT messages, spam is defined as the number of MT delivery requests for a specific subscriber 236 exceeding a predefined number within a specific time interval. For example, spam for a particular service type may be defined as 20 delivery requests within three minutes. For MO messages, spam is defined as the number of MO delivery requests from a specific subcriber 236 exceeding a predefined number within a specific interval. The following list provides some of the major functions of the D2 220:

1. The D2 220 receives a query from the SG 222 containing the service type, source address and destination address;
2. For MT service, the D2 220 updates its message delivery request counters for the mobile destination number (MDN) contained in the destination address parameter. If the number of delivery requests have been exceeded for the time interval, then D2 220 returns a status of 'deny'. Otherwise, the D2 220 returns a status of 'allow';
3. For MO service, the D2 220 updates its message delivery request counters for the MDN contained in the source address parameter. If the number of delivery requests have been exceeded for the time interval, then the D2 220 returns a status of 'deny'. Otherwise, the D2 220 returns a status of 'allow'; and
4. The D2 220 maintains a list of denied MDNs. If the MDN is on the denied list, the D2 220 returns a status of 'deny'.

According to the preferred mode of the first embodiment of the present invention, the following assumptions are made: Numerous ESMEs 202 will attach to the Messaging Complex 216; the ESMEs 202 may be wireless or non-wireless; the Messaging Complex 216 will consist of a number of physical MC platforms; the interface between ESMEs 202, MCs $224_1$–$224_x$, and SG 222 will be SMPP over TCP/IP; for capacity and redundancy purposes, a teleservice may be delivered by more than one MC $224_1$–$224_x$; one MC $224_1$–$224_x$ may deliver more than one teleservice; physical MC $224_1$– $224_x$ platforms may be supplied by more than one vendor; Teleservice applications may be supplied by more than one vendor; teleservices will be delivered in a number portability environment; services, except for activations, will be mobile directory number (MDN) based; ESMEs 202 will communicate with the SG 222 using dedicated network connections; traffic between the ESMEs 202 and SG 222 may or may not travel over the Internet depending on the security desired; and two over-the-air-activation processor (OTAP) nodes will be required for activations.

The SG 222 supports protocol data units (PDUs) defined by the SMPP v 3.4 specification and is backwards compatible to older versions. The SG 222 also supports vendor-specific error codes returned in a command_status parameter. These error codes include, for example: "Service Type Not Available" (0x00000410); "ESME Not Authorized for Service Type" (0x00000411); "Service Denied" (0x00000412); "Invalid Service Type" (0x00000413); "ESME Prohibited" (0x00000414); "Congestion" (0x00000400). These error code values are implemented using the block of error code values reserved for vendor-specific errors.

The SG 222 requires the introduction of the new SMPP error codes described in the following Table 1:

| Command Status Description | Conditions When Returned |
| --- | --- |
| Service type not available | The SG determines that no MCs are available to deliver the requested service. This could occur when all MC that deliver a specific service type are unavailable. For MT messages this error is returned by SG to ESME in:<br>1. Submit_SM_Resp<br>2. Submit_Multi_Resp<br>3. Data_SM_Resp<br>For MO messages this error is returned by the SG to MC in:<br>1. Deliver_SM_Resp<br>2. Data_SM_Resp |
| ESME not authorized for service type | The SG determines that the ESME is not authorized to request delivery of the service_type specified in:<br>1. Submit_SM<br>2. Submit_Multi<br>3. Data_SM<br>For MT messages this error is returned by SG to ESME in:<br>1. Submit_SM_Resp<br>2. Submit_Multi_Resp<br>3. Data_SM_Resp |
| Service denied | The SG determines that the message cannot be delivered because it failed anti-spam check. For MT messages this error is returned by SG to ESME in:<br>1. Submit_SM_Resp<br>2. Submit_Multi_Resp<br>3. Data_SM_Resp<br>For MO messages this error is returned by the SG to MC in:<br>1. Deliver_SM_Resp<br>2. Data_SM_Resp |
| ESME Prohibited | The ESME has been placed in prohibited state by administrative action at the SG. ESME Prohibited is returned if an ESME attempts to bind to the SG if while it has a state of prohibited at the SG. |
| Congestion | The MC returns Congestion when its inbound message queue exceeds a specific threshold. The congestion command_status indicates that the ESME should invoke flow control. |

Figure 3:
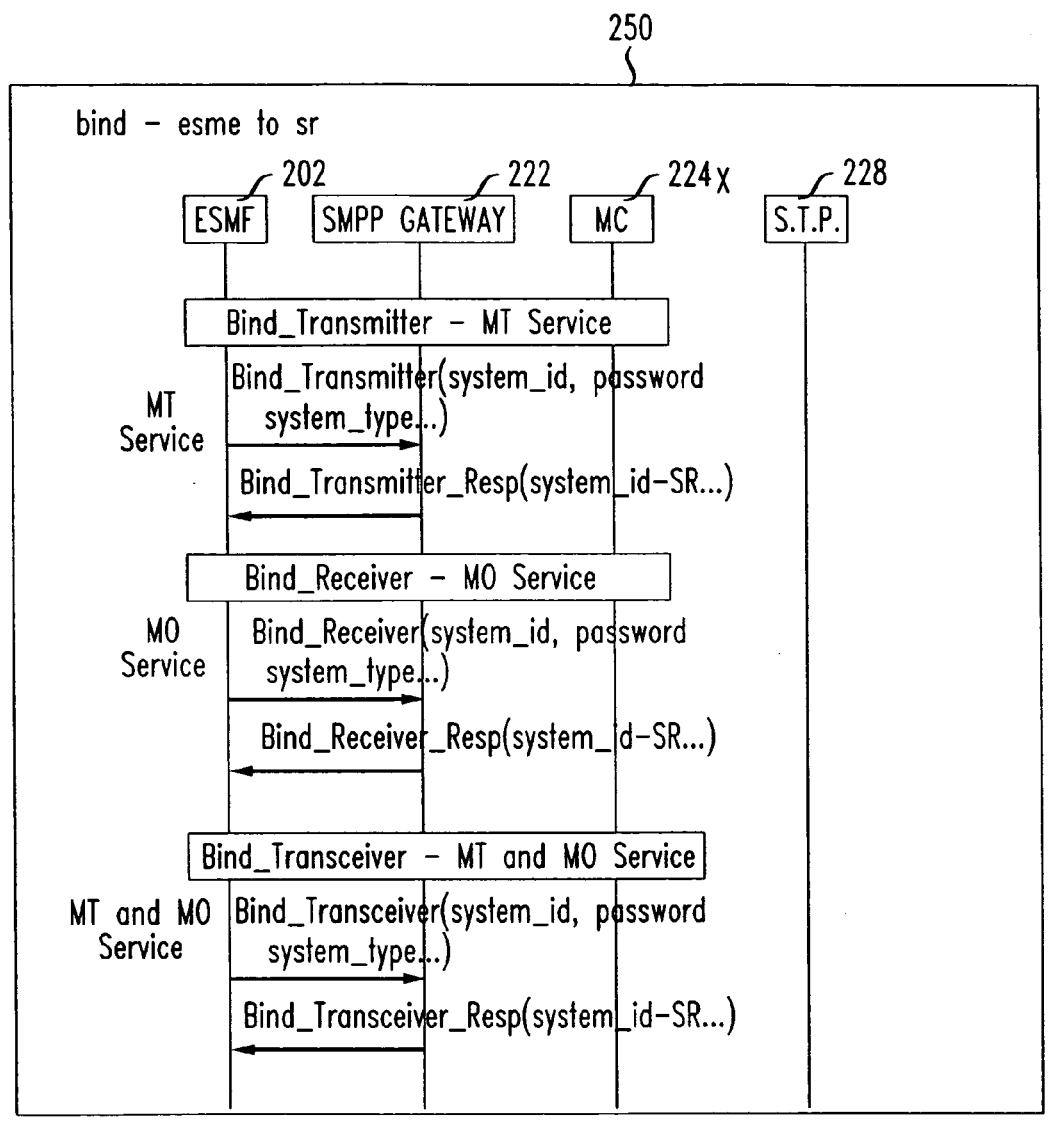
FIG. 3 shows the process of an ESME binding to the SG.

Now we turn to a discussion of the binding process between ESMEs 202 and the SG 222. In order for an ESME 202 to request and deliver a message according to the present invention, the ESME 202 must "bind" to the SG 222. This process is illustrated in FIG. 3. The "bind" operation is comparable to logging into a computer system. The external system requests a session with the gateway by presenting an ID and a password. If the ID and password are successfully authenticated, a session is established between the gateway and the ESME 202. An ESME 202 binds to the SG 222 as a transmitter for mobile terminated (MT) services. A bind request (Bind_Transmitter) includes the system_id, a unique identifier for the ESME 202, password, and system_type. System_type identifies the type of service that the ESME 202 will deliver. The SG 222 verifies that the ESME 202 is authorized using system_id, password, and system_type. The MCs $224_1$–$224_x$ repond with a Bind_Transmitter_Resp signal including system_id and MC signals. The system_id identifies the SG 222. If a bind is not successful, the SG 222 returns the appropriate command_status including Bind Failed, Invalid Password, and Invalid System ID.

An ESME 202 binds to the SG 222 as a receiver for mobile originating (MO) services using the Bind_Receiver PDU. All other steps are the same as described in the Bind_Transmitter signal above. In general, the response from a bind operation indicates whether the bind attempt was successful or the response is an error code describing the error that prevented the connection.

An ESME 202 binds to the SG 222 and all defined MCs $224_1$–$224_x$ configured for MT and MO services as a transceiver/receiver for interactive services using the Bind_Transceiver PDU. All other steps are the same as described in the Bind_Transmitter signal. At initialization, the SG 222 binds to all of the MCs $224_1$–$224_x$ that it is configured to know about.

The SG 222 enables the introduction of a different binding concept from previous concepts. For MT messages, an ESME 202 binds to the SG 222. The SG 222 binds and maintains binds to many MCs $224_1$–$224_x$. The mapping of many binds from the SG 222 to MC $224_1$–$224_x$ for MT services and the mapping of many binds from the SG 222 to many ESMEs 202 for MO services is a critical functionality for the SG 222.

For MT services, the SG 222 mantains binds to many MCs $224_1$–$224_x$ while maintaining a single bind to the ESME 202. The ESME 202 does not need to know how or to which MC $224_1$–$224_x$ to bind. The same concept applies in reverse to MO Messages. The SG 222 maintains binds to many ESMEs 202 while maintaining a single bind to the MC $224_1$–$224_x$. The MC $224_1$–$224_x$ does not need to know how or to which ESME 202 to bind. The many binds from the SG 222 to the MCs $224_1$–$224_x$ are mapped for MT services and the many binds from the SG 222 to many ESMEs 202 are mapped for MO services. The communication between the ESME—SG—and MC is accomplished using TCP/IP for transport. The TCP/IP protocol transports the SMPP protocol messages.

Figure 4:
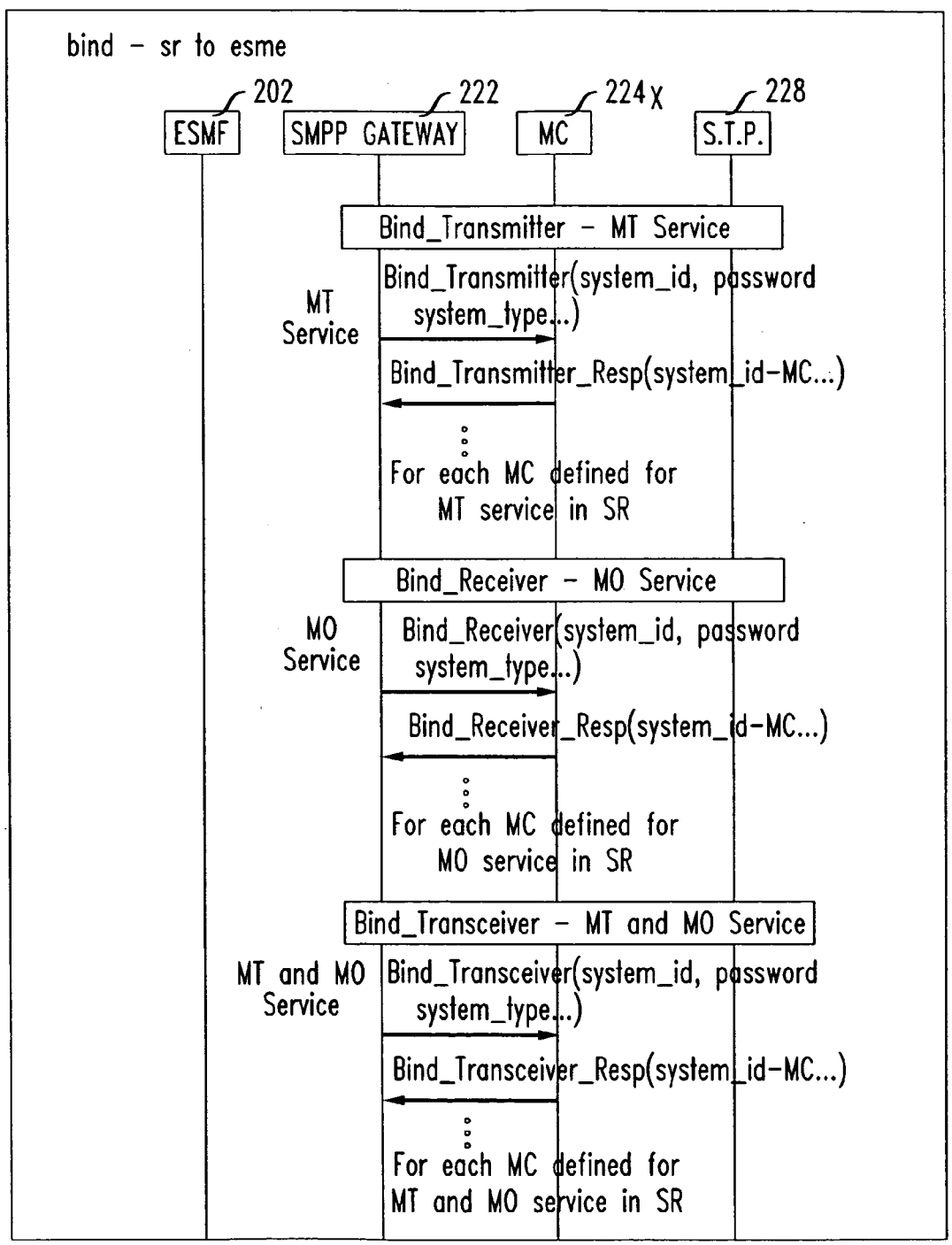
FIG. 4 shows the process of the SG binding to MCs.

The process of the SG 222 binding to the MCs $224_1$–$224_x$ is illustrated in FIG. 4. As shown in FIG. 4, the SG 222 maintains the availability status of each of the MCs $224_1$–$224_x$ and attempts to rebind in case a bind is lost or fails. As discussed above, there are different binding methods for respective services available: MT service, MO service and MT and MO service.

The SG 222 populates the Bind_Transmitter, Bind_Receiver, and Bind_Transceiver PDUs according to the bind parameters configured for the MC $224_1$–$224_x$. The SG 222 updates its internal routing tables to indicate the status of each MC $224_1$–$224_x$. The SG 222 also maintains an association between services and available MCs $224_1$–$224_x$. In this scenario, the SG 222 maintains a static reference between services and each MC $224_1$–$224_x$. In the preferred mode of the first embodiment of the invention, the SG 222 queries the MCs $224_1$–$224_x$ to determine the services each MC $224_1$–$224_x$ delivers and their status. The SG 222 then preferably binds to the MC $224_1$–$224_x$. In another aspect of the invention, the SG 222 may bind to a service type, rather than to an MC $224_1$–$224_x$.

The binding process includes protocols for handling failed binding scenarios. For example, if a bind attempt between the SG 222 and an MC $224_1$–$224_x$ fails, the SG 222 may issue an alarm. The bind fail alarm, if provided, contains, at a minimum, MC system_id, time, and bind failure reason. Additional information may be provided.

If an established bind between the SG 222 and an MC $224_1$–$224_x$ fails, the SG 222 issues an alarm. The bind lost alarm shall contain, at a minimum, MC system_id, time, and bind loss reason if known. Additional information may also be provided.

If a bind attempt between the SG 222 and MC $224_1$–$224_x$ fails, the SG 222 periodically attempts to establish the bind. If a bind between the SG 222 and a MC $224_1$–$224_x$ is lost, the SG 222 periodically attempts to reestablish the bind. The SG 222 maintains a configurable bind retry interval. The bind retry interval applies to failed and lost binds. In the preferred embodiment, the bind retry interval has a resolution of 1 minute and a default value of 5 minutes. However, other values may be used as retry intervals or default values.

All bind attempts to MCs $224_1$–$224_x$, successful or unsuccessful, are logged in the event log. The minimum information provided includes time, MC system_id, system type, and bind status. If bind status returns as "unsuccessful," the failure reason is provided, along with other information if desired. Bind parameters for each MC $224_1$–$224_x$ are configured at the SG 222. A further discussion of the details of bind parameter provisioning is provided below.

It is necessary for the SG 222 to support ESMEs 202 and MCs $224_1$–$224_x$ operating at different SMPP interface version levels. For mobile terminated (MT) service, the level of service available in the wireless network is determined by the interface version available at the MC $224_1$–$224_x$. An ESME 202 should not be able to request services using an interface version that is not yet supported by the MC $224_1$–$224_x$. If an ESME 202 binds to the SG 222 and requests message delivery at the SMPP interface version that is greater than the version supported at the destination MC $224_1$–$224_x$, the message is rejected at the SG 222. Basic backward compatibility rules apply. The SG 222 routes messages to the selected MC $224_1$–$224_x$ only when the SMPP interface version of the selected MC $224_1$–$224_x$ is equal to or greater than the SMPP interface version of the originating ESME 202. The SG 222 rejects messages routed to the selected MC $224_1$–$224_x$ when the SMPP interface version of the selected MC $224_1$–$224_x$ is less than the SMPP interface version of the originating ESME 202. The SG 222 then returns a System Error (0x00000008) error code to the originating ESME 202.

For mobile originated message service, if an MC $224_1$–$224_x$ requests message delivery at an SMPP interface version that is greater than the version supported at the destination ESME 202, the message is rejected at the SG 222. Basic backward compatibility rules apply. The SG 222 routes messages to the selected ESME 202 only when the SMPP interface version of the selected ESME 202 is equal to or greater than the SMPP interface version of the originating MC $224_1$–$224_x$. The SG 222 rejects messages routed to the selected ESME 202 when the SMPP interface version of the selected ESME 202 is less than the SMPP interface version of the originating MC $224_1$–$224_x$. The SG 222 in this case returns a System Error (0x00000008) error code to the originating MC $224_1$–$224_x$.

Figure 5:
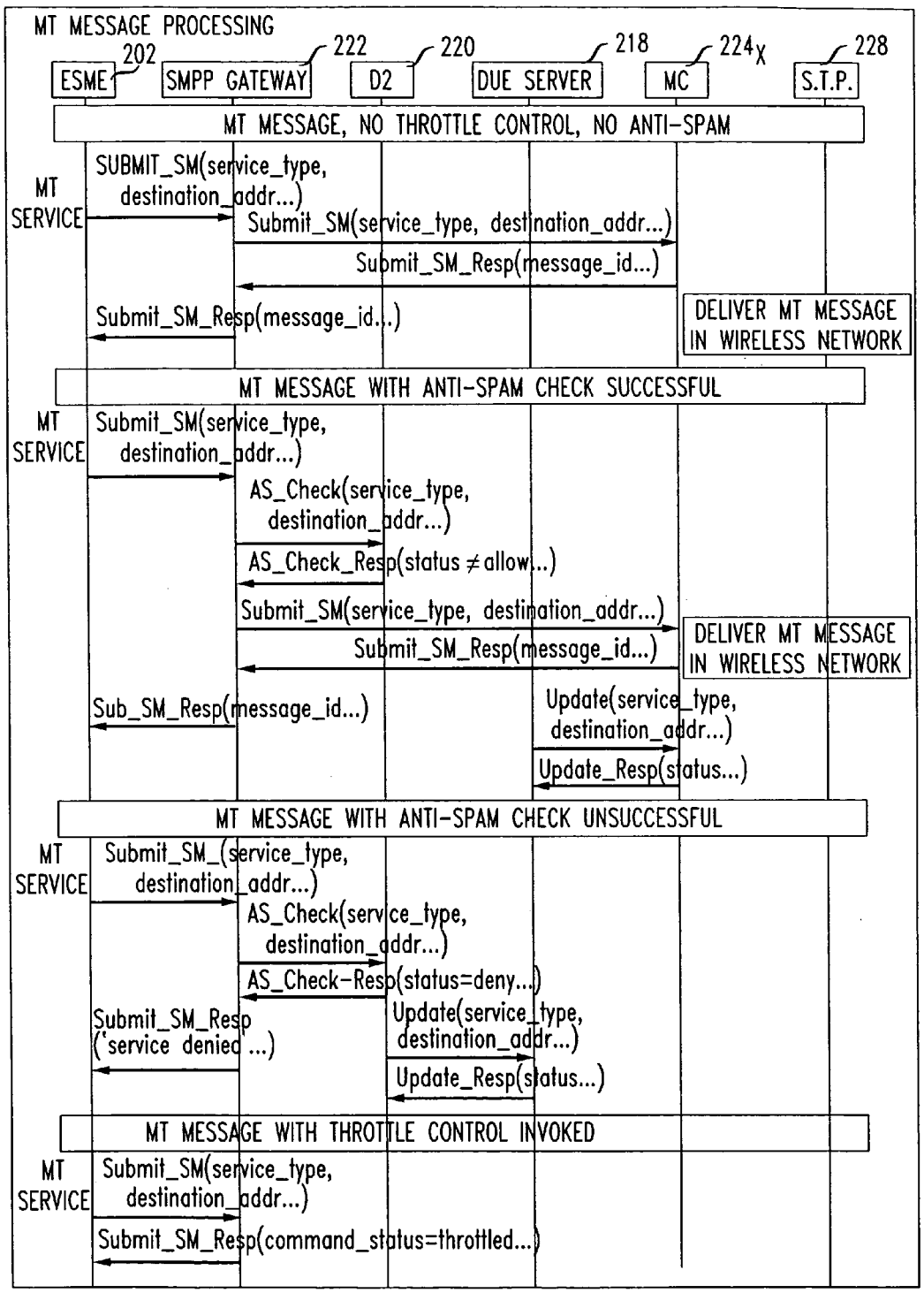
FIG. 5 illustrates an example of a mobile-terminated message flow.

The message flow for a mobile terminated (MT) message is illustrated in FIG. 5. In the MT mode, the ESME 202 sends a Submit_SM signal to SG 222. The service_type parameter identifies the service to be delivered. The SG 222 invokes a routing method based on service_type and routing method dependent parameters to select destination MC $224_1$–$224_x$. The MT routing methods apply for ESME 202 to MC $224_1$–$224_x$ communication and include such methods as MC specific, load balancing, MDN range, equal allocation and ESN. These will be discussed in more detail below. Using the appropriate routing method, a primary destination MC $224_1$–$224_x$ is first selected. If the primary destination MC $224_1$–$224_x$ is not available, a secondary MC $224_1$–$224_x$ is selected.

Figure 6:
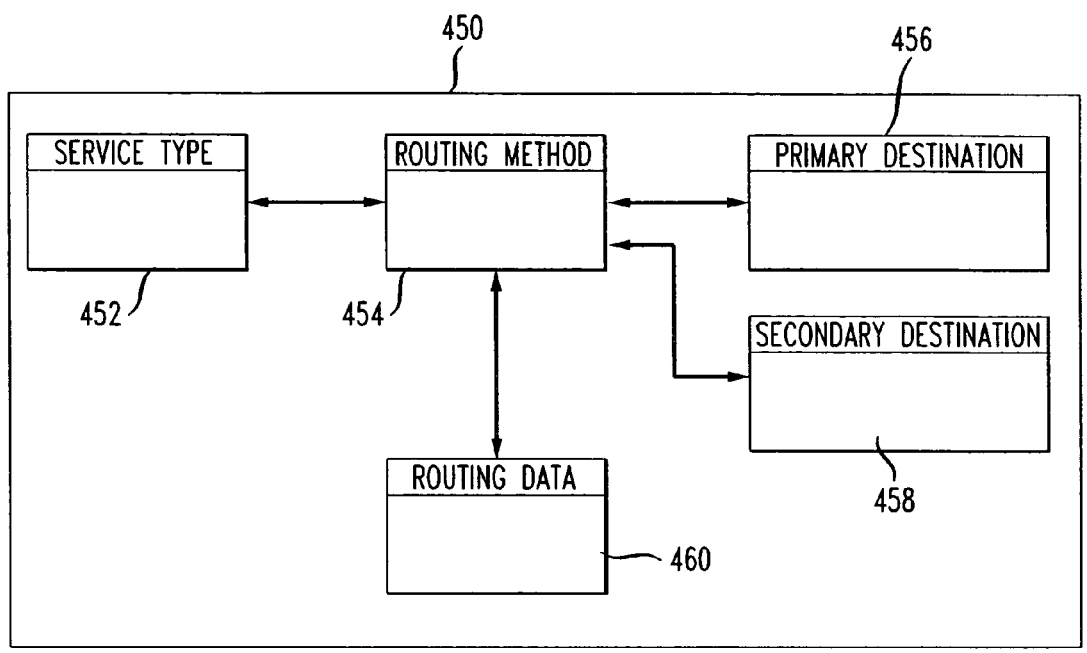
FIG. 6 shows exemplary routing of a message based on the service type.

FIG. 6 illustrates the routing based on service_type. Each service type 452 has an associated routing method 454. The SG 222 determines a primary 456 or secondary 458 destination using the routing method, routing data 460, and parameters in the SMPP message. Service types are defined independently of the teleservice used to deliver the service. This approach allows service types to be created that are not identified by the underlying teleservice.

An ESME 202 requests delivery of a message for a specific service type. The SG 222 routes the message to the MC $224_1$–$224_x$ that delivers that service type. The MC $224_1$–$224_x$ uses a specific teleservice type to deliver the message. With this approach new service types, from an ESME perspective, can be introduced without the introduction of new teleservices. Additional service types are configurable in the SG 222. Service types do not have be teleservice-specific as long as there is end-to-end continuity of service definition. For example, different priority CMT messages could be assigned different service types in the SG 222 and routed to MCs $224_1$–$224_x$ dedicated to high or low priority messages.

For example, the following service types could be defined in Table 2:

| ESME Service Type | Description |
| --- | --- |
| SMS | MT SMS |
| SMS - high priority | MT SMS given higher delivery priority |
| SMS - MO | MO SMS to e-mail address destination |

-continued

| ESME Service Type | Description |
|---|---|
| Information services | Push information services. Potentially many variations of this service type. |
| Telematics | MT and MO telematics services. Potentially many variations of this service type. |
| WAP | Interactive services using WAP |
| OAA | Activations |
| OAP | Reprogramming |

The routing methods described herein require that the message_id parameter uniquely identify the message and the MC $224_1$–$224_x$ that delivered the message. The message_id parameter is intended to uniquely identify each message sent between the ESME 202 and an MC $224_1$–$224_x$. When a number of MCs $224_1$–$224_x$ are used to deliver messages, it cannot be guaranteed that the message_id returned by a MC $224_1$–$224_x$ will be unique across all MCs $224_1$–$224_x$. To eliminate this ambiguity, each message passing through the gateway requires a unique message_id. The message_id must uniquely identify the message and the MC $224_1$–$224_x$ that delivered it. A unique message_id parameter that identifies both a message and message center is required to support Query_SM, Cancel_SM, and Replace_SM operations.

To support these operations it is necessary for the SG 222 to return a unique message_id to the ESME 202 with each message submitted. The ESME 202 then can use the message_id in these operations to uniquely identify the subject message. Several options are possible for providing a unique message_id. In the preferred embodiment of the invention, option 1 below is chosen. These are:

1. Configure each MC $224_1$–$224_x$ so that it uses a specific range for the message_id. This will uniquely identify each message and the message center that delivered it. The message_id is recycled within its defined range on each MC $224_1$–$224_x$. Up to 65 octets are allowed for message_id.

2. Have the SG 222 assign a unique message_id to Submit_SM_Resp, Submit_Multi_Resp, Data_SM_Resp, and Deliver_SM_Resp. This could be accomplished by prepending a message center key to the message_id returned to from the MC $224_1$–$224_x$. For example, a new message_id MC_key+MC message_id.

The routing methods introduced above establish the rules used to route messages to a destination. Different routing rules are used for MT and MO messages. MT routing methods apply to ESME 202 to MC $224_1$–$224_x$ routing. A MT service type can have one of the following routing methods shown in Table 3:

| MC Specific | Route all messages for this service type to a specific MC. |
|---|---|
| Load Balancing | Route messages to a group of MCs based on load capabilities of each MC in the group. Each MC in the group is allocated messages based on its capacity. |
| MDN Range | Route to a specific MC based on the MDN range of the destination address. The objective of this routing method is to provide deterministic routing for a group of MCs delivering a service that require Replace if Present (RIP). For RIP to be effective messages for the same destination must be routed to the same MC for delivery. |
| Equal Allocation | Route messages to a group of MCs based on sequentially sending messages to each MC in the group. Each MC in the group gets an equal number of messages. |
| ESN | For OATS use ESN to route to the destination MC. |

The following Table 4 describes the SMPP PDUs and parameters used for each MT routing method.

| Routing Method | SMPP PDUs | SMPP Parameters Used for Routing | RIP Supported | Query Supported |
|---|---|---|---|---|
| MC Specific | Submit_SM Data_SM Submit_Multi | -service_type | Yes | Yes |
| Load Balancing | Submit_SM Data_SM Submit_Multi | -service_type | No | Yes |
| MDN Range | Submit_SM Data_SM Submit_Multi | -service_type -destination_addr | Yes | Yes |
| Equal Allocation | Submit_SM Data_SM Submit_Multi | -service_type | No | Yes |
| ESN | Submit_SM | -service_type -short_message | Yes | Yes |

We first discuss the MC Specific routing method. The SG 222 routes all Submit_SM; Data_SM; or Submit_Multi PDUs with the same service_type to the same MC $224_1$–$224_x$. The MC Specific routing method allows a primary and alternate destination MC to be defined, although definition of an alternate MC $224_1$–$224_x$ is not mandatory. The MC Specific routing method routes the MT message to the primary destination MC $224_1$–$224_x$ if the primary MC $224_1$–$224_x$ is available. If the primary destination MC $224_1$–$224_x$ is not available, the MC Specific routing method routes the MT message to the alternate destination MC $224_1$–$224_x$.

If both primary and alternate MCs $224_1$–$224_x$ are unavailable, the MC specific routing method responds to the ESME 202 with a command_status of Service Type Not Available in the Submit_SM_Resp, Data_SM_Resp, or Sumibt_Multi-Resp PDUs if the SG 222 cannot route a message to an MC $224_1$–$224_x$ because all MCs $224_1$–$224_x$ defined to deliver the service_type are unavailable.

The Load Balancing routing method routes messages to a group of MCs $224_1$–$224_x$ based on load capabilities of each MC $224_1$–$224_x$ in the group. Each MC $224_1$–$224_x$ in the group is allocated messages based on its capacity. For example, Table 5 illustrates the proportioning of messages:

| MC in Group | Proportion of Messages Allocated |
|---|---|
| MC-1 | 25% |
| MC-2 | 50% |
| MC-3 | 25% |
| Total | 100% |

The SG 222 provides a Load Balancing routing method for MT messages. The Load Balancing routing method routes Submit_SM; Data_SM, or Submit_Multi PDUs with the same service_type to one of a group of MCs $224_1$–$224_x$ based on the message allocation established for each MC $224_1$–$224_x$. The Load Balancing routing method allows a group of MCs $224_1$–$224_x$ delivering the same service_type to be defined. The group contains two or more MCs $224_1$–$224_x$. This routing method also allows the proportion of messages allocated to each MC $224_1$–$224_x$ in the group to be defined. The proportion is defined as a percentage of messages allocated to each MC $224_1$–$224_x$.

The Load Balancing routing method routes messages to each of the MCs $224_1$–$224_x$ in the load balancing group based on proportion of messages allocated to each MC $224_1$–$224_x$. Using the example above, if 100 messages are routed for a service type in some time interval, MC-1 will receive 25 messages, MC-2 will receive 50 messages and MC-3 will receive 25 messages. If an MC $224_1$–$224_x$ in a Load Balancing routing method group becomes unavailable, the messages destined for the unavailable MC $224_1$–$224_x$ are routed to the remaining MCs $224_1$–$224_x$. The messages are allocated to the remaining available MCs $224_1$–$224_x$ based on the remaining MCs $224_1$–$224_x$ allocation of total capacity. The allocation added to each remaining MC $224_1$–$224_x$ equals the allocation lost/number remaining MCs $224_1$–$224_x$. Using the example above, suppose MC-3 becomes unavailable. Allocation added to each remaining MC=allocation lost/number of remaining MCs. Allocation added to each of the remaining MCs=25%/2 (=12.5%). MC-1 is now allocated 37.5% of the total (25%+12.5% from MC-3). MC-2 is allocated 62.5% of the total (50%+12.5% from MC-3).

If both primary and alternate MCs are unavailable, the Load Balancing routing method responds to the ESME 202 with a command_status of Service Type Not Available in the Submit_SM_Resp, Data_SM_Resp, or Submit_Multi-Resp PDUs if the SG 222 cannot route a message to an MC $224_1$–$224_x$ because all MCs $224_1$–$224_x$ defined to deliver the service_type are unavailable.

The MDN range routing method routes messages to a specific MC $224_1$–$224_x$ based on the MDN range of the destination address. The objective of this routing method is to provide deterministic routing for a group of MCs $224_1$–$224_x$ delivering a service that requires guaranteed message delivery order or Replace If Present (RIP). For RIP to be effective, messages for the same destination must be routed to the same MC $224_1$–$224_x$ for delivery. The MDN range routing method has two possible configurations:

First, a complete range of MDNs is defined for the MDN routing group (from 000–000 through 999–999). This is illustrated in Table 6:

| MDN Range Low | MDN Range High | Primary MC | Alternate MC |
|---|---|---|---|
| 001–000 | 425–999 | MC-1 | MC-2 |
| 426–000 | 605–999 | MC-2 | MC-1 |
| 606–000 | 999–999 | MC-3 | MC-2 |

Second, an incomplete range of MDNs plus a Default MC is defined for the MDN routing group. Any destination_address not within the defined MDN ranges is routed to the Default MC. In this example any destination_address that is not in the 001–000 to 605–999 range is routed to the Default MC. This is shown by way of example in Table 7:

| MDN Range Low | MD Range High | Primary MC | Alternate MC |
|---|---|---|---|
| 001–000 | 425–999 | MC-1 | MC-2 |
| 426–000 | 605–999 | MC-2 | MC-1 |
| Default | Default | MC-3 | MC-4 |

The MDN Range routing method routes all Submit_SM; Data_SM, or Submit_Multi PDUs with the same service_type to one of a group of MCs $224_1$–$224_x$ based on the value of the MDN in the destination_addr parameter. The MDN Range routing method allows a group of MCs $224_1$–$224_x$ delivering the same service_type to be defined. The group contains two or more MCs $224_1$–$224_x$.

The MDN range used by the MDN Routing method is defined by a low and a high MDN value with a resolution of NPA-NXX. The MDN Range routing method allows MDN ranges to be assigned to each MC $224_1$–$224_x$ in the group. It is possible to assign more than one MDN range to each MC $224_1$–$224_x$. The MDN Range routing method does not allow overlapping MDN ranges to be defined for a specific service_type.

The MDN Range routing method allows a Default MC to be defined. If the MDN received in the destination_address parameter is not within the any of the MDN ranges defined for the group, the message is routed to the Default MC.

The SG 222 issues an alarm when a message is routed to the default MC $224_1$–$224_x$. The minimum information provided includes the time, service type, source ESME, destination_address of message routed to the default MC, and the default MC. Other information may also be provided. The SG 222 logs all occurances of messages routed to the default MC $224_1$–$224_x$. The minimum information provided includes time, service type, source ESME, destination_address of message routed to the default MC, and the default MC. Other information may be provided.

The MDN Range routing method for a specific service_type does not become effective unless MDN range definition is complete and provides for routing of any MDN (from 000–000 through 999–999) or a Default MC is defined. The MDN Range routing method allows definition of an alternate MC $224_1$–$224_x$ for each MDN range.

If the primary MC $224_1$–$224_x$ for the MDN range is not available and an alternate MC $224_1$–$224_x$ is defined and available, the MDN Range routing method routes messages to the alternate MC $224_1$–$224_x$. If the primary MC $224_1$–$224_x$ for the MDN range is not available and an alternate MC $224_1$–$224_x$ is not defined or not available, the MDN Range routing method responds to the ESME 202 with a command_status of Service Type Not Available in the Submit_SM_Resp, Data_SM_Resp, or Submit_Multi-Resp PDUs, if the SG 222 cannot route a message to an MC $224_1$–$224_x$ because all MCs $224_1$–$224_x$ defined to deliver the service_type are unavailable.

The equal allocation routing method routes messages to a group of MCs $224_1$–$224_x$ based on sequentially sending messages to each MC $224_1$–$224_x$ in the group. Each MC $224_1$–$224_x$ in the group is sent an equal number of messages. The SG 222 provides an Equal Allocation routing method for MT messages. The Equal Allocation routing method routes all Submit_SM, Data_SM, or Submit_Multi PDUs with the same service_type to one of a group of MCs $224_1$–$224_x$ based on sequentially sending messages to each MC $224_1$–$224_x$ in the group. The Equal Allocation routing method allows a group of MCs $224_1$–$224_x$ delivering the same service_type to be defined. The group shall contain two or more MCs $224_1$–$224_x$.

The equal allocation routing method sends an equal number of messages to each MC $224_1$–$224_x$ in the group. One message is sent to each of the destination MCs $224_1$–$224_x$ before any destination MC $224_1$–$224_x$ is sent another message. If a MC $224_1$–$224_x$ in an Equal Allocation routing method group becomes unavailable, messages destined for the unavailable MC $224_1$–$224_x$ are routed to the remaining MCs $224_1$–$224_x$ within the group. If all MCs $224_1$–$224_x$ in an equal allocation routing group become unavailable, the routing method responds to the ESME 202 with a command_status of Service Type Not Available in the Submit_SM_Resp, Data_SM_Resp, or Submit_Multi-Resp PDUs if the SG 222 cannot route a message to an MC $224_1$–$224_x$ because all MCs $224_1$–$224_x$ defined to deliver the service_type are unavailable.

We now turn to an overview of the activation process for a mobile station 236. Activation requests are sent to an over-the-air-activation processor (OTAP) MC $224_1$–$224_x$ delivering the OATS teleservice. For activation, the destination_address parameter in the Submit_SM contains the mobile identification number (MIN) to be assigned to the MS 236. The short_message parameter contains the ESN along with other activation data. Each MS 236 has a unique activation MIN that follows the standard NPA-NXX-XXX format: NPA is always 000; NXX-XXX is derived from the ESN. The MS 236 registers at the OTAP MC $224_1$–$224_x$ using the activation MIN (not the MIN to be assigned to the MS). The OTAP MC $224_1$–$224_x$ associates the activation MIN with the ESN received in Submit_SM and subsequently sends the activation data to the MS 236. The following example describes how the activation MIN is derived from the ESN.

1. The ESN is 4 octets in length. The first octet is the manufacture code and the remaining three octets are the ESN. For example, a decimal ESN=12205092081 (D7 hex 7A EC F1 hex).
2. The manufacture code (D7 hex) is dropped leaving 7A EC F1 hex.
3. This value is converted to decimal: 7A EC F1 hex=8056049 decimal.
4. The least significant seven digits are used as the NXX-XXX portion of the activation MIN. The least significant seven digits of the ESN are appended to the activation NPA, 000, resulting in an activation MIN of 0008056049.

The ESN routing method is used to route activation requests to two or more MCs $224_1$–$224_x$ delivering the OATS teleservice. If two OATS MCs $224_1$–$224_x$ are used, then routing is based on the odd—even value of the decimal ESN. One MC $224_1$–$224_x$ receives activation requests with even ESNs, one MC $224_1$–$224_x$ receives activation requests with odd ESNs. If more than two OATS MCs $224_1$–$224_x$ are used, then routing is based on an ESN range assigned to each MC $224_1$–$224_x$ in the group. The ESN range is defined by the last two digits of the decimal ESN. This allows up to 100 MCs $224_1$–$224_x$ in a group. For example, Table 8 illustrates the ESN ranges:

| MC in Group | ESN Range Low | ESN Range High |
| --- | --- | --- |
| OATS-1 | 00 | 33 |
| OATS-2 | 34 | 67 |
| OATS-3 | 68 | 99 |

The SG 222 provides an ESN routing method. The ESN routing method shall route Submit_SM PDUs with the same service_type to one of a group of MCs $224_1$–$224_x$ based on the value of the ESN in the short_message parameter. The ESN routing method shall allow a group of MCs $224_1$–$224_x$ delivering the same service_type to be defined. The group shall contain two or more MCs $224_1$–$224_x$. The ESN routing method supports two routing options:

1. When an ESN routing group contains two OATS MCs $224_1$–$224_x$, routing shall be based on the odd or even value of the decimal ESN.
2. When an ESN routing group contains more than two OATS MCs $224_1$–$224_x$, routing shall be based on the value of the last two digits of the decimal ESN.

When the ESN routing group contains two MCs $224_1$–$224_x$, one MC $224_1$–$224_x$ is defined to receive activation requests containing even ESNs in the short_message parameter and one MC $224_1$–$224_x$ is defined to receive activation requests containing—odd ESNs in the short_message parameter. The requirements in the following paragraph apply only to routing to more than two MCs $224_1$–$224_x$.

When the ESN routing group contains more than two MCs $224_1$–$224_x$, the ESN routing method requires an ESN range be defined for each destination MC $224_1$–$224_x$ in the group. The ESN range used by the ESN routing method is defined by a low and high value for the last two digits of the ESN. The ESN routing method does not allow overlapping ESN ranges to be defined for a specific service_type. The ESN routing method for a specific service_type shall not become effective unless the ESN range definition is complete and provides for routing of any ESN (last two digits from 00 through 99).

If the destination MC $224_1$–$224_x$ for the ESN is not available, the ESN routing method responds to the ESME with a command_status of service type Not Available in the Submit_SM_Resp, Data_SM_Resp, or Submit_Multi_Resp PDUs if the SG 222 cannot route a message to an MC $224_1$–$224_x$ because all MCs $224_1$–$224_x$ defined to deliver the service_type are unavailable.

The column of Table 4 labeled Query Supported represents support for Query_SM, Cancel_SM, and Replace_SM operations. The Submit_SM_Resp, Data_SM_Resp, and Submit_Multi_Resp signals return a unique message_id to the sending ESME 202 for each message submitted. The message_id uniquely identifies the message and the MC $224_1$–$224_x$ that sent the message. The ESME 202 populates the message_id parameter in the Query_SM, Cancel_SM, and Replace_SM operations with the message_id returned in the original submission. The Query_SM, Cancel_SM, and Replace_SM operations are discussed in more detail below. The SG 222 uses the message_id to route the message to the correct MC $224_1$–$224_x$. The MC $224_1$–$224_x$ uses the message_id and associated parameters received in the message to perform the requested operation.

To make most efficient use of MC $224_1$–$224_x$ and wireless network resources, RIP are used by the ESME 202 when possible. To effectively implement RIP, all messages for the same service type and destination address (MDN) must be routed to the same MC $224_1$–$224_x$ for delivery. If a pending message for the service type and destination address (MDN) is present, it is replaced with the new message. This is not a problem when only one MC $224_1$–$224_x$ delivers a service. When a group of MCs $224_1$–$224_x$ delivers the same service, the problem is determining which MC $224_1$–$224_x$ in the group may contain a pending message that should be replaced by the current message. Several solutions are possible:

1. Allow all MCs $224_1$–$224_x$ delivering a service to access a shared database of pending messages. RIP could then be implemented effectively by a group of MCs $224_1$–$224_x$. Current MC $224_1$–$224_x$ architecture does not support this approach.
2. Establish a routing type at the SG 222 that routes a delivery request to the same MC $224_1$–$224_x$ given service type and destination address.

Routing by MDN range implements option two above. For example, a service type requiring RIP is delivered by multiple MCs $224_1$–$224_x$. An NPA range is established, in the SG 222, for each MC $224_1$–$224_x$. The SG 222 routes messages to the MCs $224_1$–$224_x$, based on service type and NPA of the destination address (MDN). Subsequent messages for the same service type and MDN are routed to the same MC $224_1$–$224_x$ using the MDN of the destination address. If RIP is requested and a message is pending, it is replaced at the MC $224_1$–$224_x$.

With this routing method the MDN range has no significance to the MC $224_1$–$224_x$ or in the wireless network; it is only used as a routing mechanism between the SG 222 and MC $224_1$–$224_x$.

We now turn to routing methods for mobile originated messaging. The MO routing methods apply for MC $224_1$–$224_x$ to ESME 202 routing. A MO service type can have one of the following routing methods, illustrated in Table 9:

| | |
|---|---|
| ESME Specific | Route all messages for this service type to a specific ESME. |
| Load Balancing | Route messages to a group of ESMEs based on load capabilities of each ESME in the group. Each ESME in the group is allocated messages based on its capacity. |
| Equal Allocation | Route messages to a group of ESME based on sequentially sending messages to each MC in the group. Each ESME in the group gets an equal number of messages. |
| Destination IP Address | Route messages to destination based on IP address contained in destination_address parameter of Delivery_SM and Data_SM. |
| Destination Address | Route message to a destination ESME based on the value of the destination_addr parameter received in the Deliver_SM and Data_SM PDUs |

The following Table 10 describes the SMPP PDUs and parameters used for each MO routing method.

| Routing Method | SMPP PDUs | SMPP Parameters Used for Routing |
|---|---|---|
| ESME Specific | Deliver_SM Data_SM | -service_type |
| Load Balancing | Deliver_SM Data_SM | -service_type |
| Equal Allocation | Deliver_SM Data_SM | -service_type |
| Destination IP Address | Deliver_SM Data_SM | -destination_address -service_type |
| Destination Address | Deliver_SM Data_SM | -destination_address -service_type |

For destination address routing, the destination_address parameter contains the IP address of the destination ESME 202. The SG 222 routes to the ESME 202 using the IP address in the destination_address parameter. Routing is subject to destination ESME 202 being bound and anti-spam check based on service_type parameter.

For the ESME 202 specific routing method, the SG 222 routes all Deliver_SM and Data_SM PDUs with the same service_type to the same ESME 202. The ESME Specific routing method allows a primary and alternate destination ESME 202 to be defined. Definition of an alternate ESME 202 is not mandatory. The ESME 202 Specific routing method routes the MO message to the primary destination ESME 202 if the primary ESME 202 is available. The ESME 202 Specific routing method routes the MO message to the alternate destination ESME 202 if the primary ESME 202 is not available. If both primary and alternate ESMEs 202 are unavailable, the ESME 202 specific routing method responds to the MC $224_1$–$224_x$ with a command_status of service type not available in the Deliver_SM_Resp or Data_SM_Resp PDUs if the SG 222 cannot route a message to an ESME because all the ESMEs defined to receive the service_type are unavailable.

The Load Balancing routing method routes messages to a group of ESMEs 202 based on load capabilities of each ESME 202 in the group. Each ESME 202 in the group is allocated messages based on its capacity. Table 11 illustrates the message allocation:

| ESME in Group | Proportion of Messages Allocated |
|---|---|
| ESME-1 | 25% |
| ESME-2 | 50% |
| ESME-3 | 25% |
| Total | 100% |

The SG 222 provides a load balancing routing method for MO messages. The load balancing routing method routes all Deliver_SM or Data_SM PDUs with the same service_type to one of a group of ESMEs 202 based on the load allocation established for each ESMEs 202. The load balancing routing method allows a group of ESMEs 202 delivering the same service_type to be defined. The defined group contains two or more ESMEs 202. The load balancing routing method allows the proportion of messages allocated to each ESME 202 in the group to be defined. The proportion is defined as a percentage of messages allocated to each ESME 202. The load balancing routing method further routes messages to each of the ESMEs 202 in the load balancing group based on proportion of messages allocated to each ESME 202.

Using the example above, if 100 messages are routed for a service type in some time interval, the ESME-1 will receive 25 messages, the ESME-2 will receive 50 messages and the ESME-3 will receive 25 messages. The load balancing routing method routes messages to each of the ESMEs 202 in the group based on the proportion of messages allocated to it. If an ESME 202 in a load balancing routing method group becomes unavailable, the messages destined for the unavailable ESME 202 are routed to the remaining ESMEs 202. The messages are allocated to the remaining available ESMEs 202 based on the remaining ESMEs 202 allocation of total capacity. The allocation added to each remaining ESME 202 equals the allocation lost/number of remaining ESMEs 202.

Using the example above, if the ESME-3 becomes unavailable, then the allocation added to each remaining ESME=allocation lost/number of remaining ESMEs. The result of the allocation added to each of the remaining ESMEs=25%/2 (=12.5%). ESME-1 is now allocated 37.5% of the total (25%+12.5% from ESME-3) and ESME-2 is allocated 62.5% of the total (50%+12.5% from ESME-3). If all ESMEs 202 in a load balancing routing group become unavailable, the routing method responds to the MC $224_1$–$224_x$ with a command_status of service type not available in the Deliver_SM_Resp or Data_SM_Resp PDUs if the SG 222 cannot route a message to an ESME 202 because all the ESMEs 202 defined to receive the service_type are unavailable.

The SG 222 also provides for routing according to the equal allocation method. According to the equal allocation method, all Deliver_SM and Data_SM PDUs are routed with the same service_type to one of a group of ESMEs 202 based on sequentially sending messages to each ESME 202 in the group. The equal allocation routing method allows a group of ESMEs 202 delivering the same service_type to be defined. The group contains two or more ESMEs 202. The equal allocation routing method sends an equal number of messages to each ESME 202 in the group. One message shall be sent to each of the destination ESMEs 202 before any destination ESME 202 is sent another message. If all ESMEs 202 in an equal allocation routing group become unavailable, the routing method responds to the MC $224_1$–$224_x$ with a command_status of service type not available in the Deliver_SM_Resp or Data_SM_Resp PDUs if the SG 222 cannot route a message to an ESME 202 because all the ESMEs 202 defined to receive the service_type are unavailable.

Another routing method is the destination IP address routing method. According to the destination IP address routing method, the SG 222 routes all Deliver_SM and Data_SM PDUs with the same service_type to the address contained in the destination_address parameter.

The destination address routing method differs from the destination IP address routing method as follows. The SG 222 provides a destination address routing method for MO messages. The destination address routing method routes all Deliver_SM and Data_SM PDUs with the same service_type to a destination ESME 202 based on the value of the first four digits of the destination_addr parameter. The first four digits of the destination_addr parameter identify the ESME 202 to which the message should be routed. The destination address routing method allows destination address values to be assigned to an ESME 202. It is possible to assign more than one destination address value to an ESME 202. The destination address assigned to an ESME 202 is four digits in length. Valid destination address values are 0000 to 9999. The destination address routing method routes the Deliver_SM and Data_SM PDUs to the destination ESME 202 based on the value of the first four digits of the destination_addr parameter received in the Deliver_SM and Data_SM PDUs.

The SG 222 maintains an association between the four-digit destination address value and an ESME 202. An example is shown in the following Table 12.

| Destination address value | ESME |
| --- | --- |
| 0000 | e-mail hub |
| 1234 | ESME A |
| 1236 | ESME B |
| 1237 | ESME B |
| 2570 | ESME C |

Given the destination address to ESME 202 associations shown in the previous table, the following Table 13 shows example routings.

| -destination_addr Parameter Value | Route To |
| --- | --- |
| 0000xxxx | e-mail hub |
| 1234xxxx | ESME A |
| 1234x | ESME A |
| 2570 | ESME C |
| 7230 | Return error code |
| 1236xxxx | ESME B |
| 1237 | ESME B |

If the value received in the first four digits of the destination_addr parameter does not correspond to any defined destination address values, the SG 222 returns an Invalid Dest Addr (0x00000000B) error code to the MC $224_1$–$224_x$. The SG 222 issues an alarm when an Invalid Dest Addr (0x00000000B) error code is sent to a MC $224_1$–$224_x$. The minimum information provided includes time, service type, source MC $224_1$–$224_x$, and destination_addr of message. Other information may be provided.

The SG 222 logs all occurrences of an Invalid Dest Addr (0x00000000B) error code being sent to an MC $224_1$–$224_x$. The minimum information provided includes time, service type, source MC, and destination_addr of message. Other information may be provided.

If the destination ESME 202 for the destination address is not available, the SG 222 responds to the MC $224_1$–$224_x$ with a command_status of Service Type Not Available in the Deliver_SM_Resp or Data_SM_Resp PDUs if the SG 222 cannot route a message to an ESME 202 because all ESMEs 202 defined to receive the service_type are unavailable.

Having discussed both the MT and MO routing methods, we now turn to a discussion of the message_id parameter. The message_id parameter is returned to an ESME 202 by the MC $224_1$–$224_x$ when a message is submitted for delivery. The message_id value is used subsequently by the ESME in Query, Cancel, and Replace (QCR) operations. The SG 222 supports three message_id mapping modes. These are summarized in the following Table 14:

| -message_id Mapping Mode | Description |
| --- | --- |
| Mode 1 - unique message_id applied at MC | MC provides unique message_id values within a specific range. SG routes QCR PDUs based on message_id range to MC mapping maintained at SG. |
| Mode 2 - unique message_id applied at SG | SG prepends a message center ID value to message_id parameter received from MC. SG routes QCR PDUs based on message center ID value mapping maintained at SG. |
| Mode 3 - Query, Cancel, Replace not supported at SG | The SG rejects all QCR PDUs. |

When mode—1 message_id mapping is selected, the SG 222 uses the provisioned MC $224_1$–$224_x$ message_id range to route Cancel_SM, Replace_SM, and Query_SM PDUs to destination MCs $224_1$–$224_x$.

If the MC $224_1$–$224_x$ cannot provide unique message_id values in response PDUs, the SG 222 will provide this function. This is accomplished at the SG 222 by prepending a unique message center ID (MCID) value to the message_id value returned by the MC $224_1$–$224_x$ in the Submit_SM_Resp, Submit_Multi_Resp, Data_SM_Resp, and Deliver_SM_Resp PDUs. The SG 222 also is required to remove the pre pended MCID values in Query_SM, Cancel_SM, and Replace_SM PDUs.

The modified message_id will have the form of MCID+message_id. Note that message ID mapping at SG 222 is only required to support Cancel_SM, Replace_SM and Query_SM operations. The discussion below on MC Provisioning provides further details regarding the MCID, message ID mapping at SG 222, and MC message_id range parameters.

The SG 222 provides a message ID mapping at SG master on/off setting for each MC $224_1$–$224_x$. If message ID mapping at SG 222 is set to on for a MC $224_1$–$224_x$, then the SG 222 requires a unique MCID value be defined for that MC $224_1$–$224_x$. The MCID values are unique to a MC $224_1$–$224_x$. If the message ID mapping at the SG 222 is set to off, then the SG 222 does not provide unique message_id mapping for the MC $224_1$–$224_x$. The SG 222 assumes that the MC $224_1$–$224_x$ provides unique message_id values as defined by the MC message_id range parameter. The SG 222 provides a configurable MCID value for each MC $224_1$–$224_x$ defined at the SG 222. The MCID value is configurable between 001 and 999.

When the SG 222 receives a Submit_SM_Resp, Submit_Multi_Resp, Data_SM_Resp, or Deliver_SM_Resp PDU and message ID mapping at SG 222 is set to on, then the SG 222 prepends the MCID value to the message_id value returned from the MC $224_1$–$224_x$. The SG 222 then sends the response PDU containing the modified message_id to the destination ESME 202. When the SG 222 receives a Query_SM, Cancel_SM, or Replace_SM PDU with a message center ID prepended to the message_id, the SG 222 removes the MCID from the message_id. The SG 222 then sends the PDU containing the message_id (with MCID removed) to the destination MC $224_1$–$224_x$.

The SG 222 uses the MCID prepended to the message_id in the Query_SM, Cancel_SM, or Replace_SM PDUs to route the PDU to the correct MC $224_1$–$224_x$. The PDU is routed to the MC $224_1$–$224_x$ identified by the MCID. If the SG 222 receives a Query_SM, Cancel_SM, or Replace_SM PDU with a message_id without a MCID prepended, the SG 222 attempts to route the PDU using the MC message_id range parameter provisioned for the MC $224_1$–$224_x$. If the routing attempt fails, the SG 222 returns Service type not available error code to the originating ESME 202.

When message_id mapping mode 3 is selected, Query, Cancel, and Replace PDUs are rejected at the SG 222. The SG 222 rejects these PDUs with the appropriate error code. When mode—3 message_id mapping is selected, the SG 222 rejects (1) all Cancel_SM PDUs with the Cancel_SM Failed error code, (2) all Query_SM PDUs with the Query_SM Failed error code, and (3) all Replace_SM PDUs with the Replace_SM Failed error code.

The message_id mapping mode is configurable at the SG 222. Mode one, two, or three may be selected.

We will next discuss the query, cancel, and replace commands. The SG 222 supports receiving Query_SM and Query_SM_Resp PDUs. When the SG 222 receives a Query_SM PDU, it routes the message to the MC $224_1$–$224_x$ identified by the message_id parameter. When the SG 222 receives a Query_SM_Resp, it routes the message to the originating ESME 202. If the destination MC $224_1$–$224_x$ is unavailable or the message_id parameter does not map to a known MC $224_1$–$224_x$, the SG 222 responds to the ESME 202 with a command_status of Service Type Not Available in the Submit_SM_Resp, Data_SM_Resp, or Submit_Multi_Resp PDUs if the SG 222 cannot route a message to a MC $224_1$–$224_x$ because all MCs $224_1$–$224_x$ defined to deliver the service_type are unavailable.

The SG 222 supports receiving Cancel_SM and Cancel_SM_Resp PDUs. When the SG 222 receives a Cancel_SM PDU with a message_id value that is not null, it will route the message to the MC $224_1$–$224_x$ identified by the message_id parameter. When the SG 222 receives a Cancel_SM_Resp, it routes the message to the originating ESME 202. When the SG 222 receives a Cancel_SM PDU with a message_id value that is null, it routes the message to the MC based on the service_type parameter. If the service_type is defined with the MC Specific or MDN Range routing methods, the Cancel_SM PDU is routed according to the rules of the routing method. If the service_type is defined with any other routing method, the SG 222 responds to the ESME 202 with a command_status of Service Type Not Available in the Submit_SM_Resp, Data_SM_Resp, or Submit_Multi_Resp PDUs if the SG 222 cannot route a message to a MC $224_1$–$224_x$ because all MCs $224_1$–$224_x$ defined to deliver the service_type are unavailable.

If the destination MC $224_1$–$224_x$ is unavailable or the message_id parameter does not map to a known MC $224_1$–$224_x$, the SG 222 responds to the ESME 202 with a command_status of Service Type Not Available in the Submit_SM_Resp, Data_SM_Resp, or Submit_Multi_Resp PDUs if the SG 222 cannot route a message to a MC $224_1$–$224_x$ because all MCs $224_1$–$224_x$ defined to deliver the service_type are unavailable.

The SG 222 supports receiving Replace_SM and Replace_SM_Resp PDUs. When the SG 222 receives a Replace_SM PDU, it routes the message to the MC $224_1$–$224_x$ identified by the message_id parameter. When the SG 222 receives a Replace_SM_Resp, it routes the message to the originating ESME 202. If the destination MC $224_1$–$224_x$ is unavailable or the message_id parameter does not map to a known MC $224_1$–$224_x$, the SG 222 responds to the ESME 202 with a command_status of Service Type Not Available in the Submit_SM_Resp, Data_SM_Resp, or Submit_Multi_Resp PDUs if the SG 222 cannot route a message to a MC $224_1$–$224_x$ because all MCs $224_1$–$224_x$ defined to deliver the service_type are unavailable. The SG 222 also supports the Enquire_Link and Enquire_Link_Resp PDUs, as well as the Alert_Notification PDU, which the SG 222 routes using the esme_addr parameter.

The SG 222 maintains the operation states of MCs $224_1$–$224_x$, ESMEs 202, and service types. The ESMEs 202 and service type may be disabled administratively. An ESME 202 may be prohibited from binding to the SG 222. A service type may be unavailable at the router because of administrative action or because all of the MCs $224_1$–$224_x$ or ESMEs 202 that provide that service type are unavailable. The SG 222 monitors the operating state of all the MCs $224_1$–$224_x$ that it is configured to route to. A MC $224_1$–$224_x$ has states of available or unavailable. The available state indicates that the MC is operating normally. The unavailable state indicates that the MC $224_1$–$224_x$ is not available and no messages will be routed to it.

The SG 222 maintains the permission state of all ESMEs 202 that it is configured to route to. An ESME 202 contains states of allowed or prohibited. The allowed state indicates that the ESME 202 is permitted to bind to the SG 222 and send and/or receive messages. The prohibited state indicates that the ESME 202 is not permitted to bind to the SG 222. If an ESME 202 with a state of prohibited attempts to bind to the SG 222 the SG 222 responds with a command_status of ESME Prohibited. If an ESME 202 is bound to the SG 222 and its state is changed to prohibited through administrative action, the SG 222 cancels the ESME's bind.

A service type may become unavailable for two reasons: First, all MCs $224_1$–$224_x$ or ESMEs 202 delivering that service type become unavailable; and second, an administrator changes the state of service type to unavailable at the SG 222 to prohibit access to that service type. The SG 222 maintains the availability state of all service types to which it is configured to route. A service type has the states of available or unavailable. The available state indicates that the service type is available to ESMEs 202 (MT case) or MCs $224_1$–$224_x$ (MO case) for routing. The unavailable state indicates the service type is not available to ESMEs 202 (MT case) or MCs $224_1$–$224_x$ (MO case).

If a service type has a state of unavailable the SG 222 responds to the ESME 202 with a command_status of Service Type Not Available in the Submit_SM_Resp, Data_SM_Resp, or Submit_Multi Resp PDUs if the SG 222 cannot route a message to a MC $224_1$–$224_x$ because all MCs $224_1$–$224_x$ defined to deliver the service_type are unavailable for MT services. The SG 222 responds to the MC $224_1$–$224_x$ with a command_status of Service Type Not Available in the Deliver_SM_Resp or Data_SM_Resp PDUs if the SG 222 cannot route a message to an ESME 202 because all ESMEs 202 defined to receive the service_type are unavailable, for MO services.

All changes to Service Type, ESME, and MC provisioning parameters are logged in an event log. The minimum information provided includes time, user id of person making the change, previous parameter value, and new parameter value. Additional information may also be provided.

The SG 222 provides a user interface for service type provisioning and configuration reporting. At a minimum, the SG 222 provides the following configurable parameters for each service type as shown in Table 15:

| Parameter | Description | Values |
|---|---|---|
| Service type | Identification of service type used in the service_type parameter | Implementation specific |
| Service termination type | Termination type of the service | MT or MO |
| Routing method | Routing method for service type | For MT services:<br>1. MC Specific<br>2. Load Balancing<br>3. MDN Range<br>4. Equal Allocation<br>5. ESN<br>For MO services:<br>1. ESME Specific<br>2. Load Balancing<br>3. Equal Allocation<br>4. Destination IP Address<br>5. Destination Address |
| Anti-Spam Check required | Determines if all messages for this service type require an anti-spam check or not | Yes or no |
| Anti-Spain Check unavailable default action | If D2 is unavailable, the SG can either allow all messages for the service type or deny all messages for the service type until D2 becomes available. This parameter defines which action to take. | 1. Allow all messages<br>2. Deny all messages |
| Service type availability | Service type availability allows an operator to make a service type available or unavailable | Available or unavailable |

MT services are only assigned MT routing methods. MO services are only assigned MO routing methods. For ESME 202 provisioning, the SG 222 provides a user interface for ESME 202 provisioning and configuration reporting. At a minimum, the SG 222 provides the following configurable parameters for each ESME 202 as shown in Table 16:

| Parameter | Description | Values |
|---|---|---|
| ESME system id | ESME system identification corresponding to the system_id parameter. | Implementation specific |
| ESME password | Password for ESME corresponding to the password parameter. | Implementation specific |
| Authorized service types | List of services that the ESME is authorized to request delivery of. These correspond to the service_type parameter. | Implementation specific |
| Throttle control limit | The throttle control limit specifies the maximum number of messages per second an ESME is allowed to send to the SG. When this limit is exceeded, the SG invokes throttle for that ESME. | Default = 1 msg/sec<br>Minimum = 0.1 msg/sec<br>Maximum = 500 msg/sec |
| ESME permission state | The ESME state allows an operator to allow or prohibit an ESME from binding to the SG. | Allowed or prohibited |

For MC provisioning, the SG 222 provides a user interface for MC provisioning and configuration reporting. At a minimum, the SG 222 provides the following configurable parameters for each MC $224_1$–$224_x$, shown in Table 17:

| Parameter | Description | Values |
|---|---|---|
| MC bind parameters<br>1. System_id<br>2. Password<br>3. System_type<br>4. Interface_version<br>5. Addr_ton<br>6. Addr_npi<br>7. Address_range | As specified in SMPP V3.4 protocol specification. | Implementation specific |

-continued

| Parameter | Description | Values |
|---|---|---|
| MC message_id range | Each MC has a unique range of values that are populated in the message_id parameter. The SG must maintain a mapping of message_id to MC to route query operations. | Implementation specific |
| MC availability | MC availability allows an operator to make a MC available or unavailable. | Available or unavailable |
| Flow Control Gap Timer | Gap timer value for flow control when the MC indicates congestion. | Minimum = 1 second Default = 60 seconds Maximum = 600 seconds |
| Message center ID (MCID) | A unique three digit identifier associated with a MC for message_id mapping at the SG. | Minimum = 000 Maximum = 999 |
| Message ID mapping at SG | Determines if the SG does message id mapping for this message center. | On or Off |

We now turn to more details regarding anti-spamming according to the present invention. The D2 220 provides anti-spam check capability for MO and MT messages. For MT messages, spam is defined as the number of MT delivery requests for a specific MS 236 exceeding a predefined number within a specific time interval. For example, spam for a particular service type may be defined as 20 delivery requests within three minutes. For MO messages, spam is preferably defined as the number of MO delivery requests from a specific MS 236 exceeding a predefined number within a specific interval. Other variations on how spam is defined may be provided as would be understood by one of ordinary skill in the art.

The following description is based on the following assumptions: (1) From the SG 222 perspective, the D2 220 provides MDN-based anti-spam check capabilities; (2) For MT messages from e-mail addresses, a source address anti-spam check will have been performed before the message is delivered to the SG 222; and (3) For performance and capacity purposes, it is preferably assumed that 100% of MO message require anti-spamming (AS) check and 50% of MT messages require AS check.

An interface between the SG 222 and the D2 220 will be used to perform the anti-spamming according to the present invention. With the details of the parameters and information disclosed herein, the appropriate interface between the SG 22 and the D2 220 may be implemented by those of skill in the art.

An exemplary anti-spam algorithm will next be described. The D2 220 contains a list of barred MDNs. A MDN becomes barred if:
 1. The MT anti-spam threshold for the MDN is exceeded;
 2. The MO anti-spam threshold for the MDN is exceeded; or
 3. The MDN has been placed on the barred list by administrative action.

The D2 220 provides a MT anti-spam threshold and a MO anti-spam threshold. The MT and MO anti-spam thresholds are configurable. Their configuration consists of a number of delivery requests and the associated time interval. When a MDN exceeds either anti-spam threshold (MT or MO), it is placed on the barred list for a specific period of time, which may be referred to as the barred interval. When the barred interval expires, the MDN is removed from the barred list. The barred interval is configurable, one value for MO and one value for MT with units of minutes, days, or permanent. The D2 220 allows a MDN to be manually added to or removed from the barred list. When a MDN is added to the barred list manually, the user is given the option of applying the currently defined barred interval or permanently barring the MDN.

The manner of performing an anti-spam check is next described. The D2 220 is capable of receiving an AS_Check query populated with destination_address, service_type, and replace_if_present_flag(RIP).

The RIP flag allows a message pending delivery at an MC to be replaced by a new message. For example, assume that a message for a specific MDN is pending delivery at the MC. A new message arrives for the MDN. Two actions are possible. First, the new message is added to the queue of messages for the MDN and, when available, the mobile receives all messages from the queue. Another possibility is to replace (RIP) the message, so that only one message is pending for a MDN at any one time. When combined with service type, RIP can be useful for delivering messages that are only valuable for a short period of time. For example, with weather reports, a subscriber would only want the most recent report, not all the ones that were missed. Therefore messages for this type of serice would use RIP. This also applies to messages used to program mobiles. E-mail messages would not use RIP because a subscriber wants to receive all of their e-mails, not just the most recent one.

The D2 220 checks if the MDN in destination_address is on the barred list. If MDN is on the barred list, the D2 220 returns a "deny" in AS_Check_Resp. If the MDN is not on the barred list, the D2 220 returns an "allowed" in AS_Check_Resp. After receiving an AS_Check query and sending an AS_Check_Resp, the D2 220 updates its MT anti-spam threshold counters for the MDN associated with the query. If the MT anti-spam threshold value is exceeded for the MDN, the D2 220 places the MDN on the barred list.

A mobile originated message anti-spam check is next described. The D2 220 is capable of receiving a AS_Check query populated with destination_address, service_type, and source_address. The D2 220 checks if the MDN in source_address is on the barred list. If MDN is on the barred list, the D2 220 returns a "deny" in AS_Check_Resp. If the MDN is not on the barred list, the D2 220 returns an "allowed" in the AS_Check_Resp signal. After receiving an AS_Check query and sending an AS_Check_Resp, the D2 220 updates its MO anti-spam threshold counters for the MDN associated with the query. If the MO anti-spam threshold value is exceeded for the MDN, the D2 220 places the MDN on the barred list.

The D2 220 does not require MDNs to be provisioned. The MDNs are added to the barred list based on queries received from the SG 222 or through administrative action.

A transaction is defined as receiving an AS_Check query and responding with an AS_Check_Resp. The D2 220 is capable of scaling to meet future capacity requirements for anti-spam checking of MT, MO, and total messages, as described in the following Table 18:

| Year | MT TPS | MO TPS | Total TPS |
| --- | --- | --- | --- |
| 1 | 27 | 1 | 28 |
| 2 | 135 | 15 | 150 |
| 3 | 439 | 56 | 495 |

The D2 220 provides a utility to configure and report MT anti-spam threshold, MO anti-spam threshold, MT barred interval, MO barred interval, MDNs on barred list, and MDNs placed on barred list manually. The D2 220 also provides a utility to manually add or remove a MDN from the barred list.

The mobile terminated (MT) message delivery protocol, with an anti-spamming check, is next described. The ESME 202 submits messages for MT delivery using Submit_SM including service_type and destination_address (MDN). The SG 222 checks for the service_type parameter in Submit_SM. If the service type has anti-spam check enabled, the SG 222 sends an 'AS_Check' message to the D2 220. The D2 220 checks the destination address, or mobile destination number (MDN) and service_type against anti-spam thresholds. For example, a query may indicate that thresholds have not been exceeded. If this is the case, the D2 220 returns status of 'allow' to the SG 222. The SG 222 routes the Submit_SM signal to the destination MC $224_1$–$224_x$. The destination MC $224_1$–$224_x$ returns a Submit_SM_Resp signal to the SG 222. The SG 222 also returns a Submit_SM_Resp signal to the ESME 202. The D2 220 then sends an Update signal to DUE Server 218 to update its anti-spam counters. The DUE Server 218 responds to the D2 220 with an Update_Resp signal containing the new status.

The MT message delivery protocol for an unsuccessful anti-spam check is next described. The ESME 202 submits a message for MT delivery using the Submit_SM signal including service_type and destination_address. The SG 222 checks the service_type parameter in the signal Submit_SM. If the service type has anti-spam check enabled, the SG 222 sends an 'AS_Check' message to the D2 220. Parameters include service_type and destination_address (MDN). The D2 220 checks the MDN and service_type against anti-spam thresholds. If a query indicates that thresholds have been exceeded, the D2 220 returns status of 'deny' to the SG 222. The SG 222 sends a Submit_SG_Resp signal with command_status set to 'service denied' to the ESME 202. The D2 220 sends an Update signal to the DUE Server 218 to update its anti-spam counters. Finally, the DUE Server 218 responds to D2 220 with an Update_Resp signal that contains a status.

Figure 7:
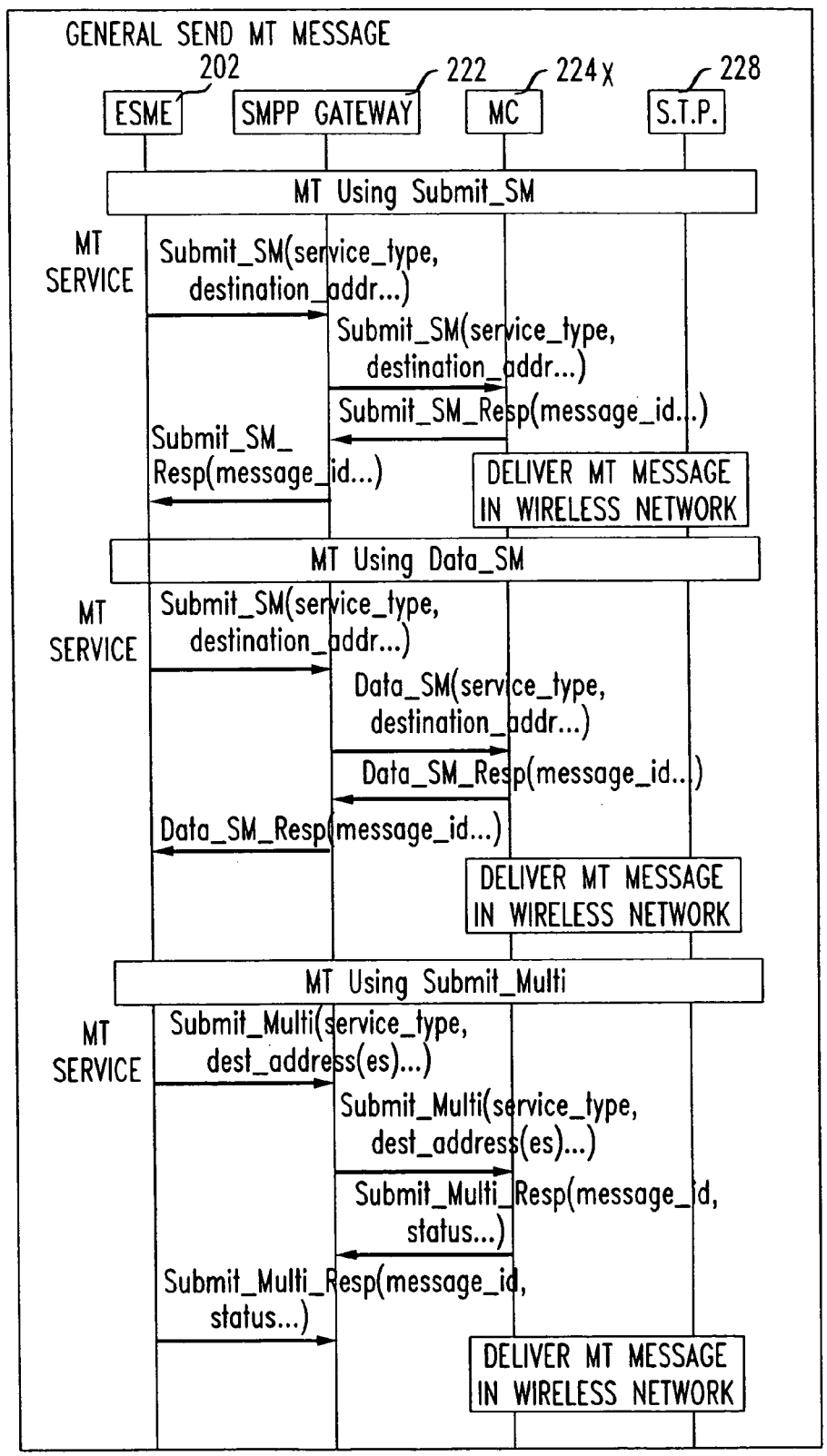
FIG. 7 illustrates another example of a mobile-terminated message delivery flow.

FIG. 7 illustrates the communication between an ESME 202, SG 222 and MC $224_1$–$224_x$ for MT message delivery. An ESME 202 sends a Submit_SM signal to the SG 222. The service_type parameter identifies the service to be delivered. The SG 222 invokes routing method based on service_type and routing method dependent parameters to select destination MC. The primary destination MC $224_1$–$224_x$ is selected. If primary destination MC $224_1$–$224_x$ is not available, a secondary MC $224_1$–$224_x$ is selected. If no MCs $224_1$–$224_x$ are available to deliver the service, the SG 222 returns a new error 'service type not available' in command_status. The SG 222 sends Submit_SM to destination MC $224_1$–$224_x$. The destination MC $224_1$–$224_x$ replies with a Submit_SM_Resp signal. The message_id parameter uniquely identifies the message and the MC $224_1$–$224_x$ that sent the message. The SG 222 sends Submit_SM_Resp to the ESME 202.

The replace_if_present_flag (RIP) parameter is an optional parameter in Submit_SM and Submit_Multi. If the RIP option is included, the ESME 202 may send a Submit_SM or Submit_Multi signal to the SG 222 with replace_if_present_flag set to 'Replace'.

A message that includes the RIP flag indicates that this message should replace any message pending (for a specific mobile) delivery at the MC. If a message is received with the RIP flag set and a message is pending at the MC $224_1$–$224_x$, the existing message (if there is one) is replaced. In this manner, the old or existing message is deleted. Therefore there is only one message pending for a mobile at any one time.

For the RIP operation to work appropriately in the context of the present invention, the message must be routed using a deterministic routing method. A deterministic routing method is one that routes messages with the same service type and destination address to the same MC $224_1$–$224_x$. All messages for the same service type and destination address must route to the same destination MC $224_1$–$224_x$ so it can be determined at the MC $224_1$–$224_x$ if a message is pending and needs to be replaced as specified by the RIP flag.

The SG 222 invokes a routing method such that a message is delivered to the MC $224_1$–$224_x$ that originally received the message. The primary destination MC $224_1$–$224_x$ is selected. Some routing methods do not support RIP. If the MC $224_1$–$224_x$ that originally received the message is not available, then the message is sent to the secondary MC $224_1$–$224_x$ defined for the service. The original message will not be replaced. However, the new message will be delivered. Thus, the subscriber may receive the same message twice. All other steps are the same as described above.

The message flow for Data_SM is the same as for Submit_SM described previously. The RIP is not a valid parameter in the Data_SM parameter. The Data_SM parameter may be used for interactive services.

MT service using the parameter Submit_Multi will now be described. An ESME 202 may use Submit_Multi specifying up to 254 destination addresses. The dest_address(es) parameter contains either the destination addresses or a Distribution List Name. The distribution list name is a file containing the destination addresses. The Message flow for Submit_Multi is the same as for Submit_SM described previously. RIP is a valid parameter in Submit_Multi. Routing is based on the first destination address in the dest_address(es) parameter. For this approach to support RIP, the destination address list must be in the same order for each message to get routed to the correct MC $224_1$–$224_x$. To support the distribution list, name-only routing to a specific MC $224_1$–$224_x$ is supported.

The present invention protects the MCs $224_1$–$224_x$ and wireless network from undesirable or abusive messaging practices by providing address flow control and anti-spam checking. The objective of flow control is to protect the messaging complex 216 and wireless network from undesirably high MT message traffic. Each ESME 202 has a maximum number of messages it is authorized to send to the SG 222 in a specific period of time. If the limit is exceeded, service is temporarily suspended. All messages received from the ESME 202 during the suspension period are rejected with a command_status indicating throttling.

The objective of anti-spam checking is to protect the messaging complex 216 and wireless network by prohibiting an unreasonably high number of messages from being sent to or received from a specific MS 236 in a short period of time. If the number of messages sent to or received from a specific MS 236 in a specific time interval is exceeded, then subsequent message delivery requests for that MS 236 are rejected for a configurable time interval.

Flow control may also be applied to MT services. Anti-spam is preferably applied to MT and MO services. For each service type, the SG 222 maintains a flow control limit and anti-spam check (ASC) required parameter. The flow control limit is the maximum number of messages that an ESME 202 is allowed to send to the SG 222 in a specific time interval. The ASC parameter identifies whether messages for the service type require anti-spam check.

Figure 8:
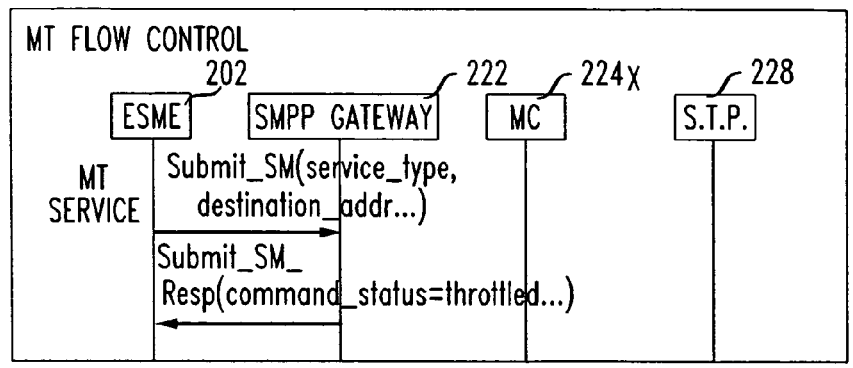
FIG. 8 shows flow control between an ESME and the SG.

The present invention provides MT flow control between an ESME 202 and the SG 222. This is illustrated in FIG. 8. The ESME 202 sends Submit_SM to the SG 222. The SG 222 determines that ESME 202 has exceeded its flow control limit. The SG 222 returns Submit_SM_Resp with command_status set to existing error code 'Throttling error—ESME has exceeded allowed message limits'. Any SMPP message received from the ESME 202 during the suspension interval is rejected with the same throttling error message.

Regarding anti-spamming, the existing Detect Undesirable Email (DUE) capability is enhanced to support queries from the SG 222. This capability is referred to herein as the D2 220. For MT messages, spam is defined as the number of MT delivery requests for a specific MS 236 exceeding a predefined number within a specific time interval. For example, spam for a particular service type may be defined as 20 delivery requests within three minutes. For MO messages, spam is defined as the number of MO delivery requests from a specific MS 236 exceeding a predefined number within a specific interval.

The major functions of the D2 220 are: (1) Receive a query from the SG 222 containing the service type, source address and destination address; (2) For an MT service, the D2 220 updates its message delivery request counters for the MDN contained in the destination address parameter. If the number of delivery requests have been exceeded for the time interval, then the D2 220 returns a status of 'deny'. Otherwise, the D2 220 returns a status of 'allow'; (3) For an MO service, the D2 220 updates its message delivery request counters for the MDN contained in the source address parameter. If the number of delivery requests have been exceeded for the time interval, then the D2 220 returns a status of 'deny'. Otherwise, the D2 220 returns a status of 'allow'; and (4) the D2 220 maintains a list of denied MDNs. If the MDN is on the denied list, the D2 220 returns a status of 'deny'.

Figure 9:
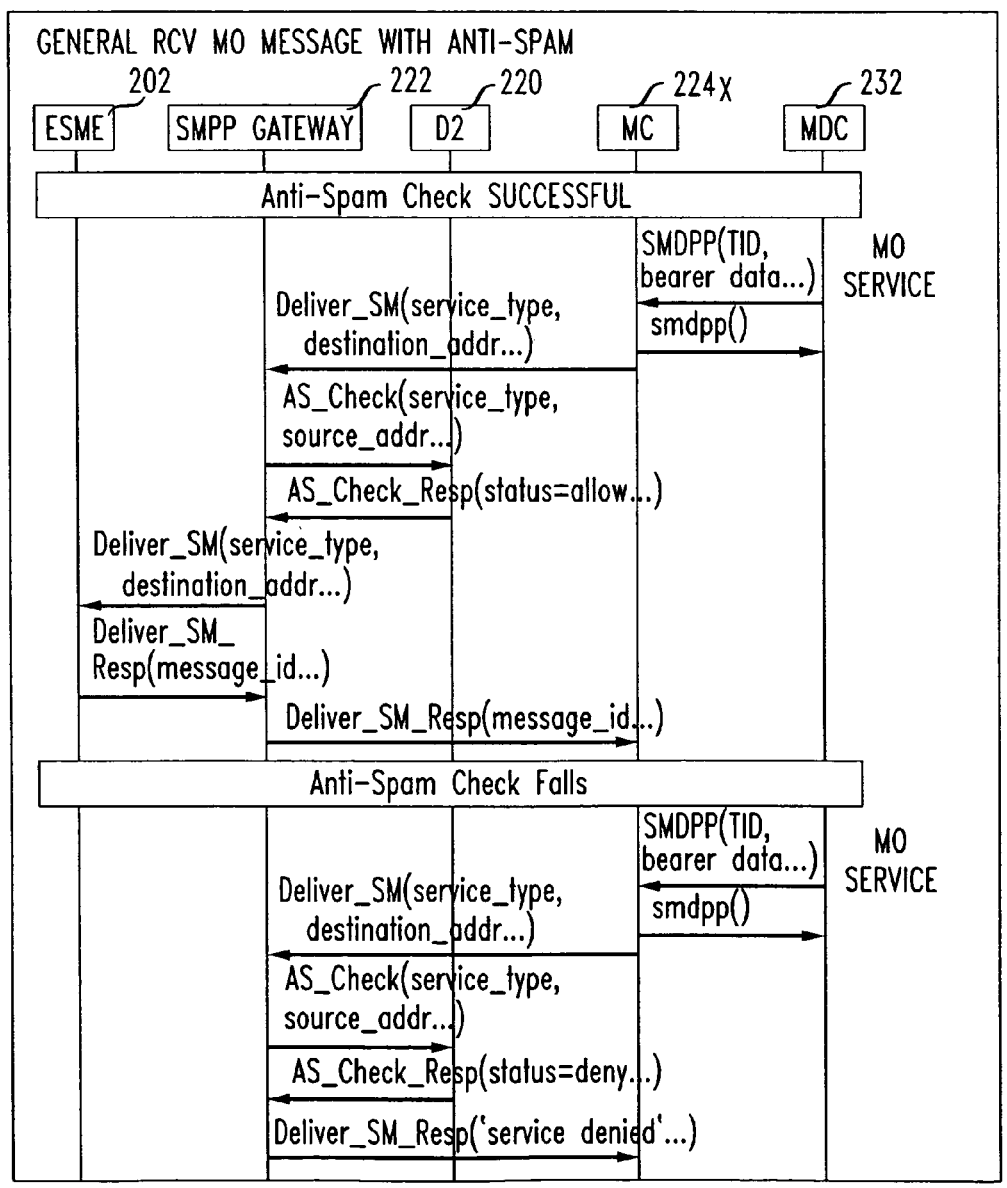
FIG. 9 shows a message delivery with anti-spam check process for mobile-originated messages.

FIG. 9 illustrates an exemplary protocol for communicating between an ESME 202, SG 222, D2 220, MC $224_1$–$224_x$ and MSC 232 for a mobile originated message where the system has an anti-spam check. We will first discuss an example of when the anti-spam check is successful. The MC $224_1$–$224_x$ receives an SMDPP signal for MO teleservice for delivery beyond the wireless network. The MC $224_1$–$224_x$ sends Deliver_SM including service_type and source_address parameters to the SG 222. The SG 222 checks service_type parameter in Deliver_SM. If service_type has anti-spam check enabled, the SG 222 sends an 'AS_Check' message to the D2 220. Parameters include service_type and source_address (MDN). The D2 220 checks the MDN and service_type against anti-spam thresholds. Assume for this example that a query indicates that thresholds have not been exceeded. The D2 220 returns status of 'allow' to the SG 222. The D2 220 updates counts for MDN and service_type based on data received in AS_Check and time received. The SG 222 routes a Deliver_SM signal to the destination ESME 202. The ESME 202 returns a Deliver_SM_Resp signal to the SG 222, which returns the Deliver_SM_Resp signal to the MC $224_1$–$224_x$.

Next, we will discuss the example process when the anti-spam check was unsuccessful. The MC $224_1$–$224_x$ receives the SMDPP signal for MO teleservice for delivery beyond the wireless network. The MC $224_1$–$224_x$ sends a Deliver_SM signal including service_type and source_address parameters to the SG 222. The SG 222 checks service_type parameter in Deliver_SM. If the service type has anti-spam check enabled, the SG 222 sends 'AS_Check' message to the D2 220. The parameters sent include service_type and source_address (MDN). The D2 220 checks source address (MDN) and service_type against anti-spam thresholds. Assume that a query indicates that thresholds have been exceeded. The D2 220 returns status of 'deny' to the SG 222. The D2 220 updates counts for MDN and service_type based on data received in AS_Check and time received. The SG 222 sends a Deliver_SM_Resp signal with command_status set to 'service denied' to MC $224_1$–$224_x$.

Figure 10:
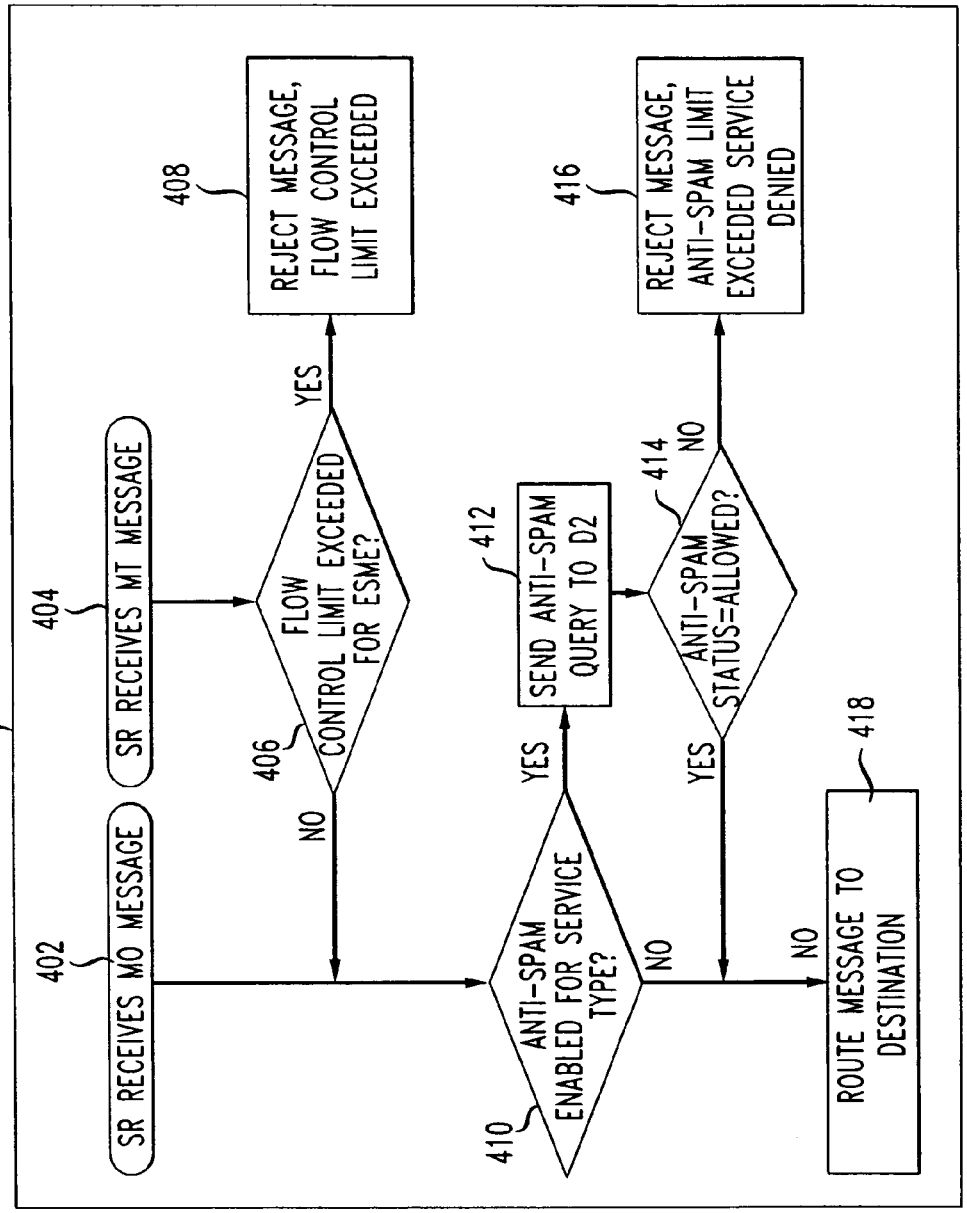
FIG. 10 shows a flow diagram for anti-spam logic for both mobile-originated and mobile-terminated messages.

A combination flow control and anti-spam logic 400 is illustrated in FIG. 10. The logic 400 of FIG. 10 applies for both MT and MO messages. For an MT message, the SG 222 receives the MT message (404) and inquires whether the flow control limit is exceeded for the sending ESME (406). If yes, the SG 222 rejects the message and transmits a message that the flow control limit is exceeded (408). If the flow control limit for the ESME 202 is not exceeded (406), the process inquires whether the anti-spam procedure is enabled for that service type (410). If yes, an anti-spam query is sent to the D2 (412) and an anti-spam status is returned. If the anti-spam status is not allowed (414), the message is rejected and a response is provided that the anti-spam limit is exceeded and service is denied (416). If the anti-spam status is allowed, then the message is routed to the destination MC (418).

For a MO message received by the SG 402, the logic proceeds to step 410, and queries whether the anti-spam service is enabled for the service type 410. If yes, an anti-spam query is sent to D2 (412) and an anti-spam status is returned. If the anti-spam status is not allowed (414), the message is rejected and a response is provided that the anti-spam limit is exceeded and service is denied (416). If the anti-spam status is allowed, then the message is routed to the destination MC (418).

Figure 11:
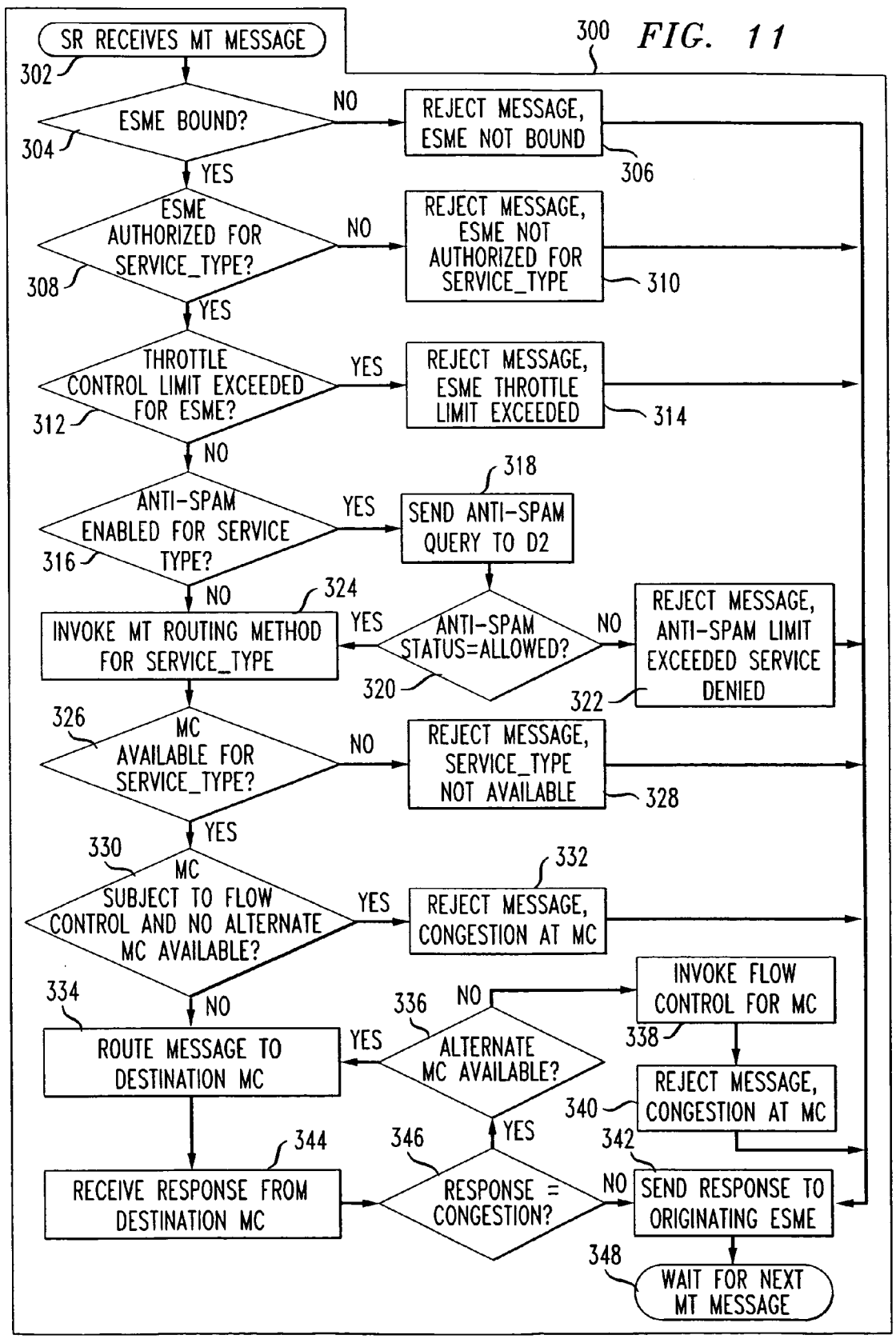
FIG. 11 shows a mobile-terminated message processing logic.

The MT message processing logic 300 at the SG 222 is shown with reference to FIG. 11. The performance requirements for MT message processing logic are that the ST 222 has a response time of 100 ms if no D2 220 query is required. The response time is defined as the time between receiving a PDU and subsequently routing and sending the PDU to its destination. The SG 222 also imposes not more than 125 ms latency if a D2 220 inquiry is required. Latency for this purpose is defined as the time between receiving a PDU and subsequently routing and sending the PDU minus the D2 220 response time.

FIG. 11 is intended to describe the required message processing logic and not to dictate specific implementation details. When the SG 222 receives (302) a Submit_SM, Data_SM, or Submit_Multi PDU from an ESME 202, it checks the bind state (304) of the sending ESME 202. If the ESME 202 is not bound, the SG 222 rejects the message (306) and returns the appropriate error code in the response PDU (342). The SG 222 then waits for the next message

348. If the ESME 202 is bound, when the SG 222 receives a Submit_SM, Data_SM, or Submit_Multi PDUs from an ESME 202, it verifies that the ESME 202 is authorized to request delivery of the service identified by the service_type parameter (308). If the ESME 202 is not authorized to request delivery of the service identified by the service_type parameter, the SG 222 rejects the message and responds to the ESME 202 with a command_status of ESME Not Authorized for Service Type in the Submit_SM_Resp, Data_SM_Resp, or Submit_Multi Resp PDUs (310). Then the SG 222 waits for the next message (348).

ESMEs 202 are allowed to send messages to the SG 222 at a maximum rate. Messages in excess of the maximum rate are subject to throttle control by the SG 222. Throttle control enables the receivership 200 to control the messaging traffic through the system according to the system capabilities and available resources. A sliding window algorithm is used to limit an ESME 202 to a maximum message delivery rate. When the SG 222 receives a PDU from an ESME 202, it verifies that the ESME 202 has not exceeded its authorized throttle control limit (312). If the ESME 202 exceeds its throttle control limit, the SG 222 rejects the message and responds to the ESME 202 with a command_status of Throttling Error (ESME has exceeded allowed message limits) in the response PDU (314, 342). The SG 222 then waits for the next message. All messages received from an ESME 202 in excess of the throttle control limit are rejected by the SG 222 with a command_status of Throttling Error. None of the excess messages are routed to a destination MC $224_1$–$224_x$. The message flow diagrams according to FIG. 11 may also apply to the Submit_Multi and Data_SM PDUs.

The SG 222 logs all throttle control events to the event log. The minimum information provided includes time, ESME 202 subject to throttle control, number of messages rejected, and throttle control limit. Additional information may also be provided.

The SG 222 may issue an alarm at step 314 when throttle control is invoked for an ESME 202. The ESME 202 flow control alarm contains, at a minimum, time, ESME 202 subject to throttle control, number of messages rejected, and throttle control limit, plus other information if desired.

The logic process shown in FIG. 11 also involves an anti-spam check. The AS_Check and AS_Check_Resp are logic messages exchanged between the SG 222 and the D2 220. When the SG 222 receives a Submit_SM, Data_SM, or Submit_Multi PDU from an ESME 202 with a service_type defined to require an anti-spam check (316), the SG 222 sends an AS_Check request (318) to the D2 220. For MT services, the AS_Check query contains the service_type, source_addr (if present), destination_addr, and replace-if-present indicator. If the AS_Check_Resp (320) has a value of deny, the SG 222 shall reject the message and respond to the ESME 202 with a command_status of Service Denied in the Submit_SM_Resp, Data_SM_Resp, or Submit_Multi Resp PDUs (322). If the AS_Check_Resp (320) has a value of allow, the SG 222 routes the Submit_SM, Data_SM, or Submit_Multi PDU to the destination MC (324).

If the D2 220 is unavailable, the SG 222 applies the anti-spam unavailable default action defined for the service type. The default action defined for each service type can be set to allow or deny. If set to allow, then all messages requiring an Anti-Spam check are routed to the destination MC $224_1$–$224_x$ when the D2 220 is unavailable. If set to deny, then all messages requiring an Anti-Spam check are rejected with a command_status of Service Denied.

If the D2 220 is unavailable and the anti-spam unavailable default action defined for the service type is set to allow, the SG 222 routes all messages requiring an AS_Check as if the AS_Check Resp returned allow (320, 324). If the D2 220 is unavailable and the anti-spam unavailable default action defined for the service type is set to deny, the SG 222 routes all messages requiring an AS_Check as if the AS_Check_Resp returned deny (320, 322).

The SG 222 logs all D2 220 outages to the event log. The minimum information provided includes time and reason for outage, plus additional information if desired. The SG 222 may issue an alarm when the D2 220 becomes unavailable. The D2 220 unavailable alarm contains, at a minimum, time and reason for outage, plus additional information may be provided.

The SG 222 issues a clearing alarm when the D2 220 becomes available. The minimum information provided includes time and indication that the D2 220 is available. Additional information may be provided. The SG 222 logs when the D2 220 becomes available after an outage. The minimum information provided shall include time and indication that D2 220 is available, plus additional information may be provided.

If the MT message successfully completes bind check, service authorization check, throttle control check, and anti-spam check, the SG 222 invokes the routing method (324) for the service identified by the service_type parameter. The SG 222 sends the Submit_SM, Data_SM, or Submit_Multi PDU to the MC $224_1$–$224_x$ identified by the routing method to determine whether the identified MC $224_1$–$224_x$ is available for the service type (326). The SG 222 receives the Submit_SM_Resp, Data_SM_Resp, or Submit_Multi_Resp PDU from the destination MC $224_1$–$224_x$ and subsequently sends it to the originating ESME 202 unaltered. The SG 222 responds to the ESME 202 with a command_status of Service Type Not Available in the Submit_SM_Resp, Data_SM_Resp, or Submit_Multi_Resp PDUs if the SG 222 cannot route a message to a MC $224_1$–$224_x$ because all MCs $224_1$–$224_x$ defined to delivery the service_type are unavailable (328). The SG 222 issues an alarm when a MT Service Type is not available (328). The minimum information provided in the alarm includes the time, Service Type, and indication that MT Service Type is unavailable, plus other information may be provided.

The SG 222 logs when a MT Service Type becomes unavailable. The minimum information provided includes the time, Service Type, and indication that MT Service Type is unavailable. Other information may be provided. The SG 222 issues a clearing alarm when a MT Service Type becomes available. The minimum information provided includes the time, Service Type, and indication that MT Service Type is available plus other information.

The SG 222 also logs when a MT Service Type becomes available. The minimum information provided includes time, Service Type, and indication that MT Service Type is available and optionally other information. The SG 222 logs all occurrences of when the Service Type Not Available command_status is returned to an ESME 202 (MT service type not available). The minimum information provided includes time, service type that could not be routed, and source ESME. Other information may be provided. The SG 222 responds to the ESME 202 with a command_status of Invalid Service Type in the Submit_SM_Resp, Data_SM_Resp, or Submit_Multi_Resp PDUs if the service_type parameter contains an unrecognized or undefined service type value.

If the identified MC $224_1$–$224_x$ is available for the service type (326), the process includes inquiring whether the MC $224_1$–$224_x$ is subject to flow control and whether no alternate MC $224_1$–$224_x$ is available (330). If yes, the MC $224_1$–$224_x$ is subject to flow control and no alternate MC $224_1$–$224_x$ is available, and if congestion exists, the message is rejected (332) and a response is sent back (342) to the originating ESME 202. The SG 222 then waits for the next message (348). If the MC $224_1$–$224_x$ is subject to flow control and an alternate MC $224_1$–$224_x$ is available (330), the message is routed to the destination MC (334). A response from the destination MC $224_1$–$224_x$ is sent (344). An MC $224_1$–$224_x$ can initiate flow control by returning a command_status of Congestion (346). If the MC $224_1$–$224_x$ response indicates congestion (346), and an alternate MC $224_1$–$224_x$ is available (336) for the service type, the SG 222 will route the message to the alternate MC $224_1$–$224_x$ as the destination MC (334). If an alternate MC $224_1$–$224_x$ is not available (336), the SG 222 returns the Congestion command_status to the originating ESME 202 and invoke flow control (338). The message is rejected due to congestion at the MC (340). A response is sent back (342) to the originating ESME 202 and the SG 222 waits for the next message (348). Flow control in this case is described more fully below in connection with FIG. 12.

If no test for congestion is desired, then step 346 shown in FIG. 11 may be omitted. In this case, the down-stream processes 336, 338 and 340 may be removed from FIG. 11 since following the received response from the destination MC $224_1$–$224_x$ in step 344, the process proceeds directly to sending a response signal to the originating ESME 202 in step 342.

Figure 12:
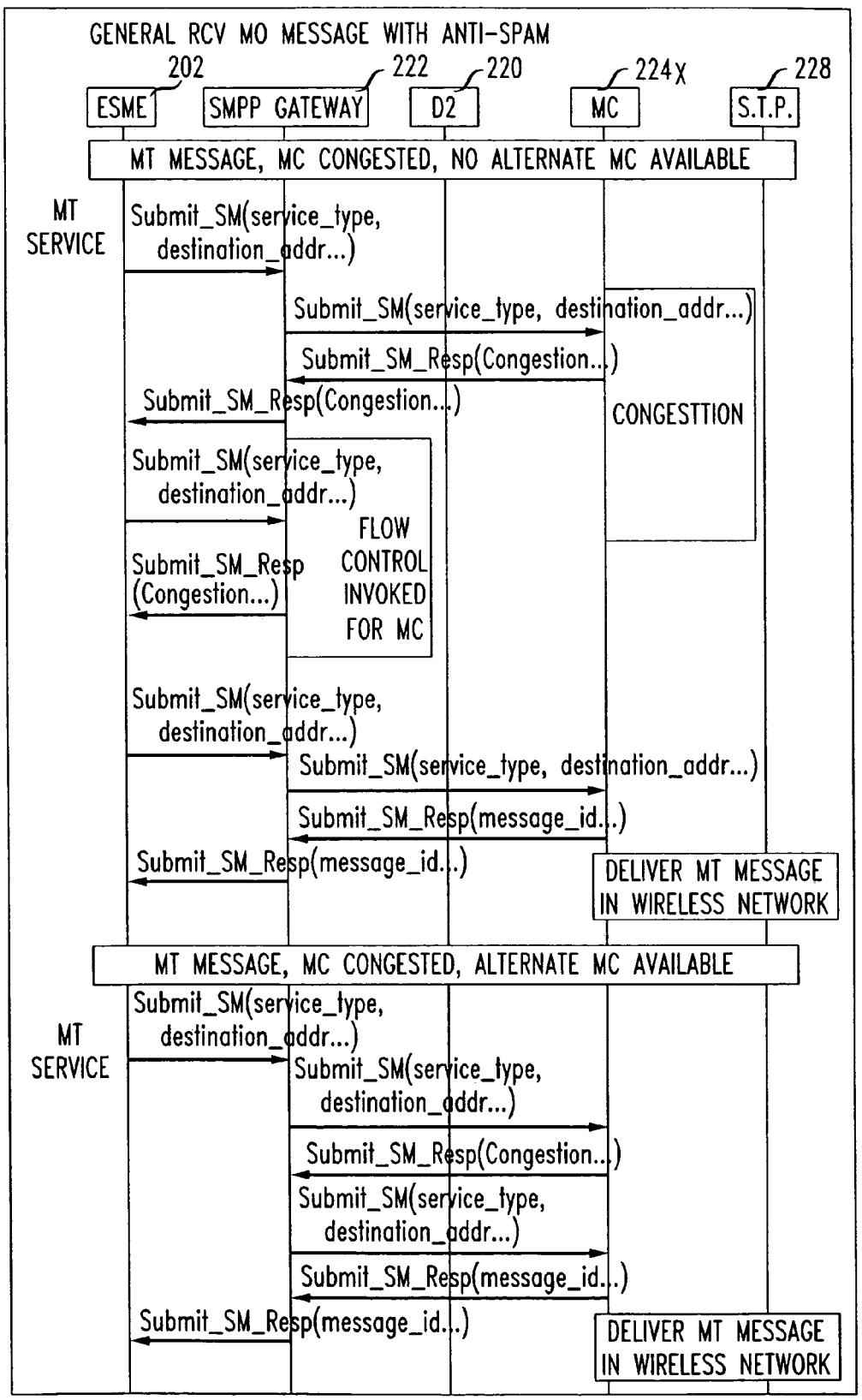
FIG. 12 shows a flow control message sequence for a scenario where the MC is congested and alternate MC's may or may not be available.

FIG. 12 illustrates in more detail the flow control message sequence discussed above in FIG. 11. FIG. 12 shows two scenarios: (1) an MT message, with a congested MC $224_1$–$224_x$ and no alternative MC $224_1$–$224_x$ available and (2) an MT message, the MC $224_1$–$224_x$ is congested, and an alternate MC $224_1$–$224_x$ available. We will begin with the first scenario. The ESME 202 submits a message for MT delivery using Submit_SM including service_type and destination_address. The SG 222 routes Submit_SM to destination MC $224_1$–$224_x$. The MC $224_1$–$224_x$ returns Submit_SM_Resp to SG 222 with command_status of congestion. No alternate MC $224_1$–$224_x$ is defined or available for the service_type. The SG 222 returns a Submit_SM_Resp signal to the ESME 202 with a command_status indicating congestion. The SG 222 invokes flow control for the MC $224_1$–$224_x$ that returned the command_status indicating congestion. The SG 222 returns command_status of Congestion for all messages received while MC $224_1$–$224_x$ is subject to flow control. Next, suppose that the congestion at the MC $224_1$–$224_x$ abates. Then, flow control is discontinued at MC $224_1$–$224_x$ and normal message routing resumes.

When flow control is invoked, the SG 222 waits for a predefined gap interval, defined by a gap timer, before sending another message to a congested MC $224_1$–$224_x$. Flow control remains in effect as long as the receiving MC $224_1$–$224_x$ returns a Congestion command_status. If message delivery to the MC $224_1$–$224_x$ is successful, indicated by a command_status other than Congestion, flow control is discontinued. While flow control is in effect for a MC $224_1$–$224_x$, all messages received by the SG 222 that would be routed to that MC $224_1$–$224_x$ receive a response command_status of congestion. This indicates to the ESME 202 to invoke its flow control algorithm.

The SG 222 will return a command_status of Congestion indicating that the ESME 202 should invoke flow control under the conditions described in Table 19:

| MT Routing Method | RIP Supported | Congestion Indication Returned to ESME |
| --- | --- | --- |
| MC Specific | Yes | 1. If primary MC invokes flow control and no alternate MC is defined.<br>2. If both primary and alternate MC (if defined) concurrently invoke flow control. |
| Load Balancing | No | 1. If all MCs in group invoke flow control concurrently. |
| MDN Range | Yes | 1. If primary MC for MDN range invokes flow control and no alternate MC is defined.<br>2. If both primary and alternate MC (if defined) concurrently invoke flow control. |
| Equal Allocation | No | 1. If all MCs in group invoke flow control concurrently. |
| ESN | Yes | 1. If primary MC invokes flow control and no alternate MC is defined.<br>2. If both primary and alternate MC (if defined) concurrently invoke flow control. |

Next, we will discuss the second scenario where an alternate MC $224_1$–$224_x$ is available. In this case, the ESME 202 submits message for MT delivery using Submit_SM including service_type and destination_address. The SG 222 routes Submit_SM to the destination MC $224_1$–$224_x$. The destination MC $224_1$–$224_x$ returns Submit_SM_Resp to the SG 222 with command_status indicating congestion. An alternate MC $224_1$–$224_x$ is defined and available for the service_type. The SG 222 routes the Submit_SM to the alternate destination MC $224_1$–$224_x$. The alternate destination MC $224_1$–$224_x$ returns a Submit_SM_Resp signal to the SG 222 indicating message accepted. The SG 222 returns Submit_SM_Resp to the ESME 202.

When the SG 222 receives a Submit_SM_Resp, Data_SM_Resp, or Submit_Multi_Resp with a command_status of Congestion and an alternate MC $224_1$–$224_x$ is defined and available for the service type, the SG 222 routes the message to the alternate MC $224_1$–$224_x$. When the SG 222 receives a Submit_SM_Resp, Data_SM_Resp, or Submit_Multi_Resp with a command_status of Congestion and an alternate MC $224_1$–$224_x$ is not defined or available for the service type, the SG 222 returns the Congestion command_status response to the ESME 202. The SG 222 invokes flow control for the destination MC $224_1$–$224_x$. The SG 222 starts a gap timer when flow control is invoked for a MC $224_1$–$224_x$. While the destination MC $224_1$–$224_x$ is subject to flow control while the gap timer has not expired, the SG 222 does not route any messages to the destination MC $224_1$–$224_x$. While the destination MC $224_1$–$224_x$ is subject to flow control while the gap timer has not expired, the SG 222 responds to all messages routed to the destination MC $224_1$–$224_x$ with a command_status of Congestion. When the gap timer expires, the next message received for the destination MC $224_1$–$224_x$ is sent to the destination MC $224_1$–$224_x$. If the destination MC $224_1$–$224_x$ responds with Congestion in the response command_status, flow control continues. If the destination MC $224_1$–$224_x$ responds with a command_status other than congestion, flow control is discontinued.

The SG 222 issues an alarm when flow control is invoked for an MC $224_1$–$224_x$. The MC $224_1$–$224_x$ flow control invoked alarm contains, at a minimum, time, MC $224_1$–$224_x$ subject to flow control, whether messages were routed to an alternate MC $224_1$–$224_x$ (if alternate MC is defined), or if congestion indication was returned to originating ESME 202. Additional information may be provided. The SG 222 logs when flow control is invoked for a MC $224_1$–$224_x$. The minimum information provided includes time, MC $224_1$–$224_x$ subject to flow control, whether messages were routed to alternate MC $224_1$–$224_x$ (if alternate MC is defined), or if congestion indication was returned to originating ESME 202. Additional information may be provided.

The SG 222 issues an alarm when flow control is discontinued for an MC $224_1$–$224_x$. The MC $224_1$–$224_x$ flow control discontinued alarm contains, at a minimum, the time, MC $224_1$–$224_x$ subject to flow control, duration flow control was in effect, and number of messages rejected during flow control. Additional information may be provided. The SG 222 logs when flow control is discontinued for a MC $224_1$–$224_x$. The minimum information provided includes time, MC $224_1$–$224_x$ subject to flow control, duration flow control was in effect, and number of messages rejected during flow control. Additional information may be provided.

Figure 13:
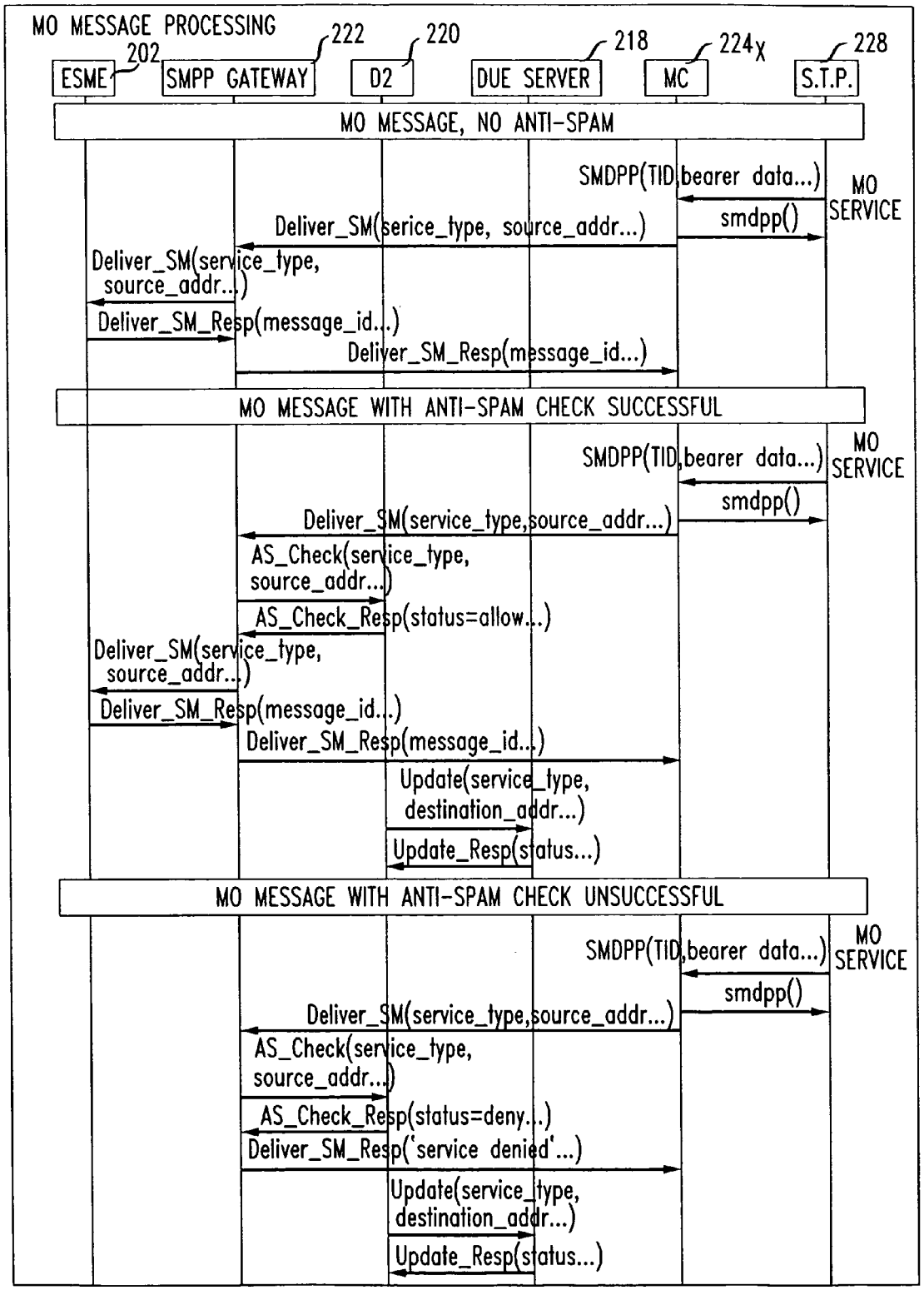
FIG. 13 illustrates a message flow for a mobile-originated message.

FIG. 13 illustrates exemplary message processing for a MO message. FIG. 13 shows three different scenarios: (1) An MO message with no anti-spam; (2) an MO message with anti-spam check successful; (3) an MO message with anti-spam check unsuccessful.

We first discuss an MO message with no anti-spamming performed. The MC $224_1$–$224_x$ receives a SMDPP signal containing a MO message. The SMDPP contains the TID, bearer data, source address, and destination address. The MC $224_1$–$224_x$ sends Deliver_SM message to the SG 222 and the SG 222 invokes a routing method based on service_type and destination_addr to select a destination ESME 202. If no ESMEs 202 are available to deliver the service, the SG 222 returns an error of 'service type not available'. The MC $224_1$–$224_x$ then resends the message to the SG 222 at a later time. The SG 222 sends Deliver_SM to the destination ESME 202. The destination ESME 202 replies with Deliver_SM_Resp signal. The SG 222 sends a Deliver_SM_Resp signal to the MC $224_1$–$224_x$. The replace_if_present_flag parameter is not used in Deliver_SM; therefore the RIP option may not be available for MO messages.

The MC $224_1$–$224_x$ may use Data_SM for delivering MO messages to the SG 222. Message flow for Data_SM is the same as for Delivery_SM described previously. RIP is not a valid parameter in the Data_SM signal.

Next, we discuss the MO message delivery when the anti-spam check is successful. The MC $224_1$–$224_x$ receives a SMDPP for MO teleservice for delivery beyond wireless network. The MC $224_1$–$224_x$ sends Deliver_SM including service_type and source_address parameters to the SG 222. The SG 222 checks service_type parameter in Deliver_SM. If service type has anti-spam check enabled, the SG 222 sends 'AS_Check' message to the D2 220. Parameters include service_type and source_address (MDN). The D2 220 checks source address (MDN) and service_type against anti-spam thresholds.

A query may indicate that thresholds have not been exceeded. The D2 220 returns status of 'allow' to the SG 222. The SG 222 routes Deliver_SM to the destination ESME 202. The ESME 202 returns Deliver_SM_Resp to the SG 222. The SG 222 returns to Deliver_SM_Resp to MC $224_1$–$224_x$. The D2 220 sends Update to DUE Server 218 to update its anti-spam counters. The DUE Server 218 responds to D2 220 with Update_Resp containing status.

Finally, with FIG. 13, we discuss the scenario where a MO message delivery occurs with the anti-spam check unsuccessful. The MC $224_1$–$224_x$ receives an SMDPP for MO teleservice for delivery beyond the wireless network. The MC $224_1$–$224_x$ sends Deliver_SM including service_type and source address parameters to the SG 222. The SG 222 checks service_type parameter in Deliver_SM. If service type has anti-spam check enabled, the SG 222 sends 'AS_Check' message to the D2 220. Parameters include service_type and source_address (MDN). The D2 220 checks the MDN and service_type against anti-spam thresholds. A query may indicate that thresholds have been exceeded. The D2 220 returns status of 'deny' to the SG 222. The SG 222 sends Deliver_SG_Resp with command_status set to 'service denied' to the MC $224_1$–$224_x$. The D2 220 sends an Update to DUE Server 218 to update its anti-spam counters. The DUE Server 218 responds to D2 220 with Update_Resp containing status. The message flow shown in FIG. 13 also applies to Data_SM PDU.

Figure 14:
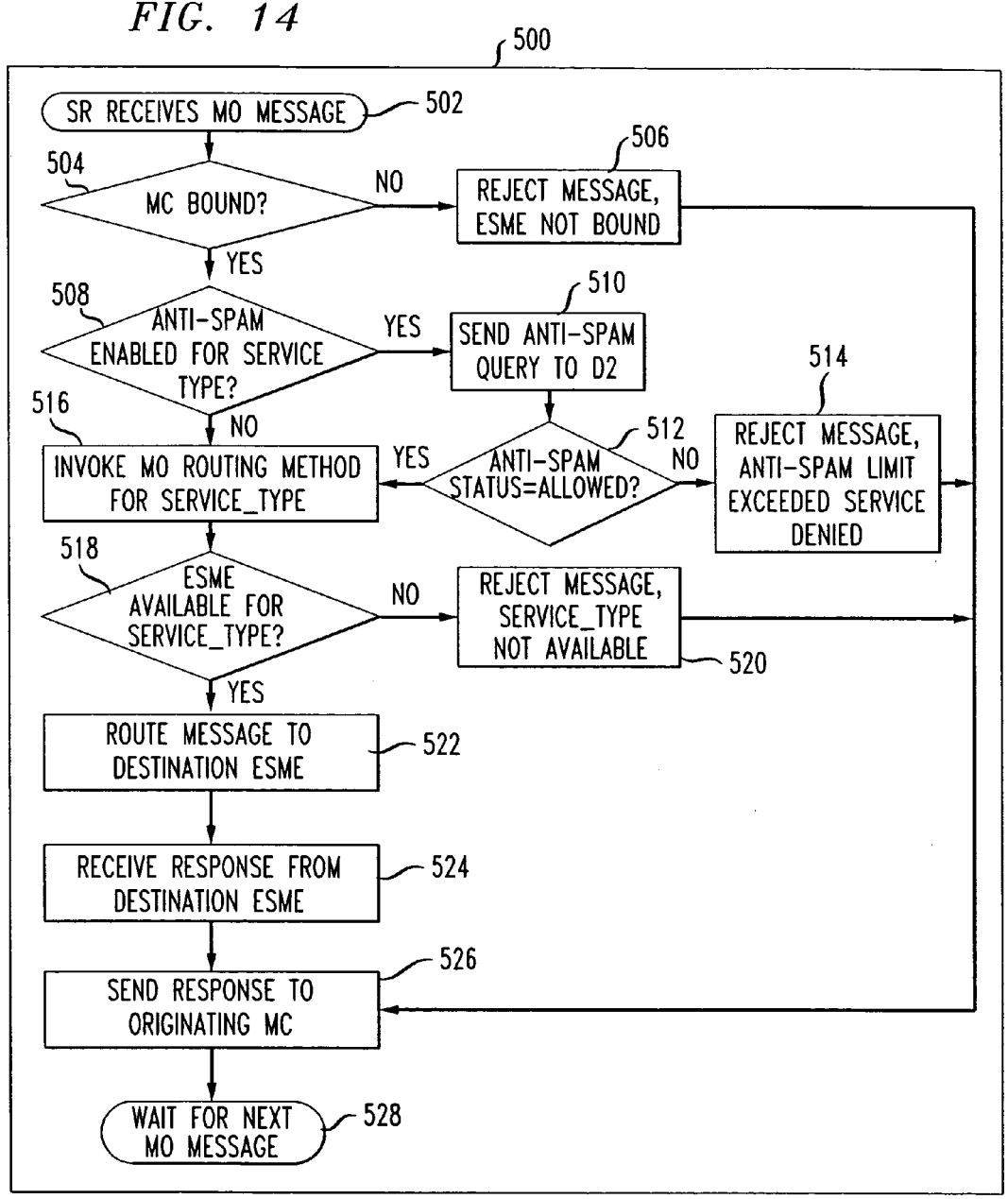
FIG. 14 illustrates exemplary message processing for a mobile-originated message.

MO message processing logic 500 at the SG 222 is shown in FIG. 14. When the SG 222 receives a Deliver_SM or Data_SM PDU from an MC $224_1$–$224_x$, it checks the bind state (504) of the sending MC $224_1$–$224_x$. If the MC $224_1$–$224_x$ is not bound, the SG 222 rejects the message (506) and indicates that the ESME 202 is not bound in the response to the originating MC (526). An appropriate error code is included in the response PDU. The SG 222 then waits for the next MO message (528).

When the SG 222 receives a Deliver_SM or Data_SM PDU 502 from an MC $224_1$–$224_x$ with a service_type configured to require an anti-spam check (508), the SG 222 sends an AS_Check request to the D2 (510). For MO service types, the AS_Check query is populated with destination_address, service_type, and source_address parameters. If the AS_Check_Resp has a value of deny (512), the SG 222 rejects the message (514) and responds to the MC (526) with a command_status of Service Denied in the Deliver_SM_Resp or Data_SM_Resp PDUs. The SG 222 waits for the next MO message (528).

If the MO message successfully completes bind check (504) and anti-spam check (512)(the anti-spam status is "allowed"), or if the anti-spam service is not enabled for the service type (508), the SG 222 invokes the routing method (516) for the service identified by the service_type parameter. The SG 222 determines whether an ESME 202 is available for the service type (518). The SG 222 sends the Deliver_SM or Data_SM PDU to the ESME 202 identified by the routing method. The SG 222 receives the Deliver_SM_Resp or Data_SM_Resp PDU from the destination ESME 202 and subsequently sends it to the originating MC $224_1$–$224_x$ unaltered. The SG 222 responds to the MC $224_1$–$224_x$ with a command_status of Service Type Not Available in the Deliver_SM_Resp or Data_SM_Resp PDUs if the SG 222 cannot route a message to an ESME 202 because all ESMEs 202 defined to receive the service_type are unavailable (520).

The SG 222 logs all occurrences of when the Service Type Not Available command_status is returned to an MC $224_1$–$224_x$ (MO service type not available). The minimum information provided includes time, service type that could not be routed, and source MC $224_1$–$224_x$. Other information may be provided. The SG 222 may issue an alarm (520) when a MO Service Type is not available. The minimum information provided includes the time, Service Type, and indication that MO Service Type is unavailable. Other information may be provided. The SG 222 logs when a MO Service Type becomes unavailable. The minimum information provided includes time, Service Type, and indication that MO Service Type is unavailable, plus other optional information.

The SG 222 issues a clearing alarm when an MO Service Type becomes available. The minimum information provided includes time, Service Type, and indication that MO Service Type is available. Additional information may also be provided. The SG 222 logs when a MO Service Type becomes available. The minimum information provided includes time, Service Type, and indication that MO Service Type is available, plus other information may also be provided.

If the response from the ESME 202 indicates that it is available for the service type (518), the message is routed to the destination ESME (522) and a response is sent to the SG 222 from the ESNE 202 indicating that the message was received (524, 526). Finally, the SG 222 waits for the next MO message (528). The SG 222 responds to the MC $224_1$–$224_x$ with a command_status of Invalid Service Type in the Deliver_SM_Resp or Data_SM_Resp PDUs if the service_type parameter contains an unrecognized or undefined service type value.

Figure 15:
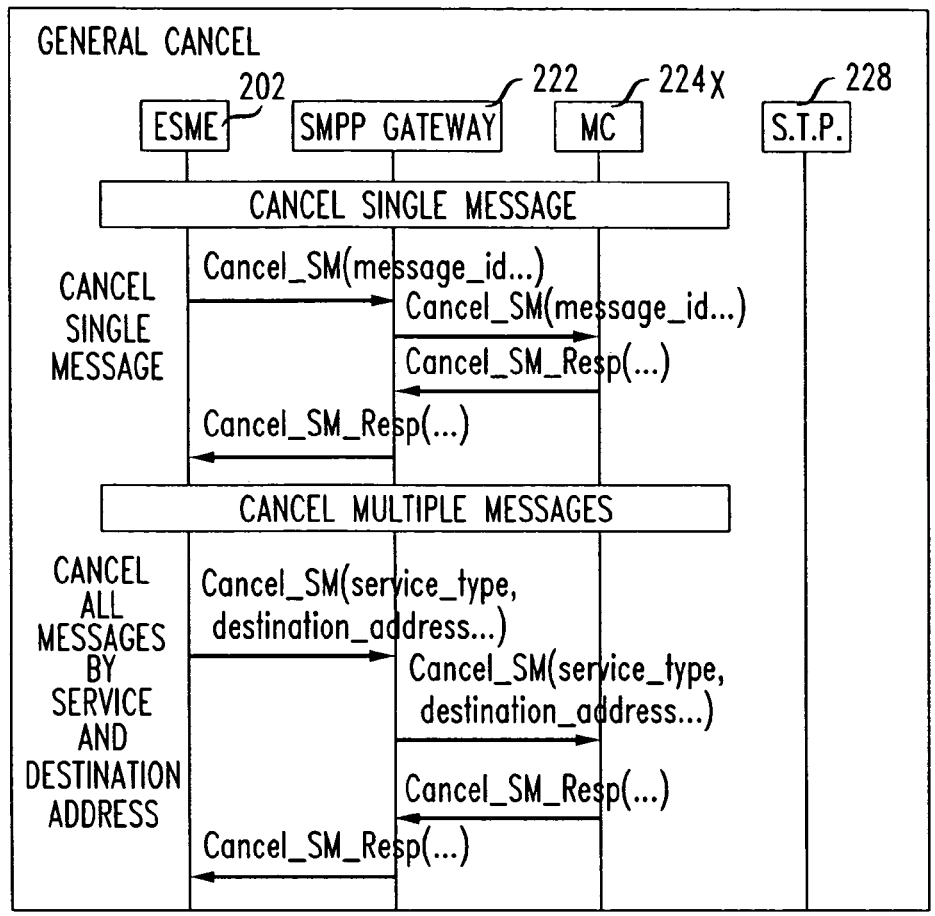
FIG. 15 shows an exemplary message cancel process.

We now turn to the cancel operation according to the present invention. This is illustrated in FIG. 15. A cancel operation is used by an ESME 202 to cancel one or more previously submitted messages. A specific message can be canceled based on the message_id and service_type parameters. A set of messages can be canceled using the service_type and destination_address parameters. FIG. 15 illustrates the cancel message procedure between an ESME 202, the SG 222, and the MC $224_1$–$224_x$.

To cancel a single message, the ESME 202 sends a Cancel_SM to the SG 222. The message_id parameter is populated with the message_id returned in the original Submit_SM, Data_SM, or Submit_Multi message. The SG 222 routes the Cancel_SM to the MC $224_1$–$224_x$ that received the original message. The message_id parameter uniquely identifies the MC $224_1$–$224_x$ that originally received the message. Note that not all routing methods support canceling messages. If the MC $224_1$–$224_x$ that originally received the message is not available, then the SG 222 returns a new error code 'Service type not available' in command_status. The destination MC $224_1$–$224_x$ replies with Cancel_SM_Resp. The SG 222 sends Cancel_SM_Resp to the ESME 202.

To cancel all messages previously submitted for a specific destination address and service type, the ESME 202 sends a Cancel_SM to the SG 222. The message_id parameter is set to null; the service_type is set to the service_type of the messages to be cancelled. The destination_addr is set to the destination addresses of the messages to be canceled. The SG 222 routes the Cancel_SM to the MC $224_1$–$224_x$ that received the original messages. Routing is based on service_type and destination_addr. If the MC $224_1$–$224_x$ that originally received message is not available, then the SG 222 returns a new error code 'Service type not available' in command_status. The destination MC $224_1$–$224_x$ replies with Cancel_SM_Resp. The SG 222 sends a Cancel_SM_Resp signal to the ESME 202.

Figure 16:
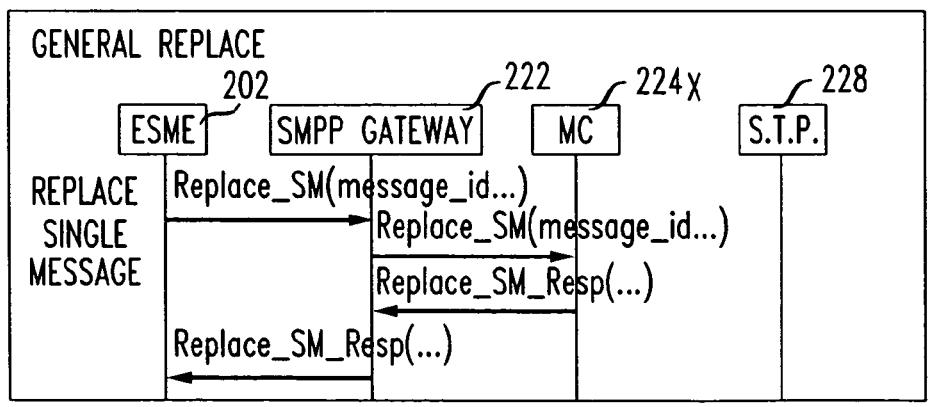
FIG. 16 shows a message replacement process.

Next, the replace opration is described with reference to FIG. 16. The replace operation is used by an ESME 202 to replace a previously submitted message that is pending delivery. An ESME 202 sends a Replace_SM signal to the SG 222. The message_id parameter is populated with the message_id returned in the original Submit_SM, Submit_Multi message. The ESME 202 retains the message_id returned in the original message. The SG 222 routes the Replace_SM to the MC $224_1$–$224_x$ that received the original message. The message_id parameter uniquely identifies the MC $224_1$–$224_x$ that originally received the message. If the MC $224_1$–$224_x$ that originally received message is not available, then the SG 222 returns a new error code 'Service type not available' in command_status. The destination MC $224_1$–$224_x$ replies with Replace_SM_Resp containing message status. The SG 222 sends Replace_SM_Resp to the ESME 202.

Figure 17:
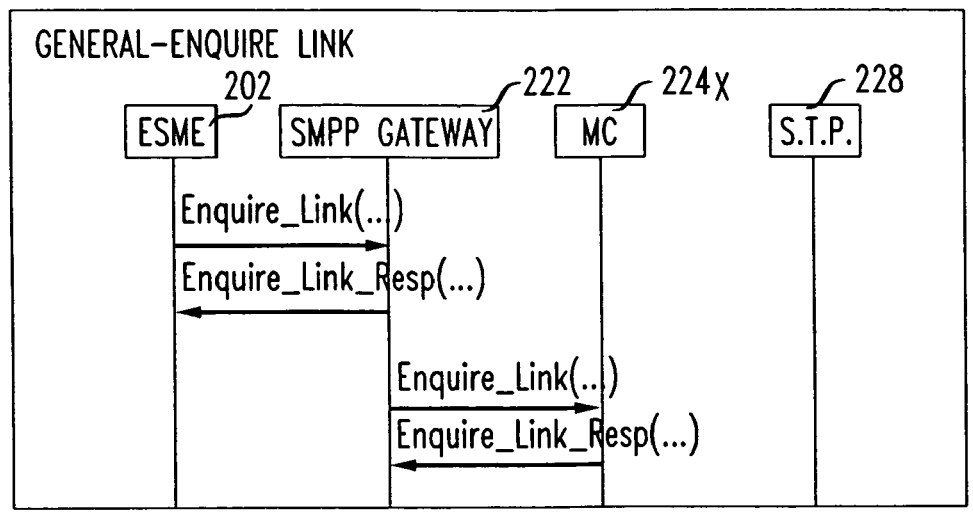
FIG. 17 shows a check link status process.

FIG. 17 shows an example of a check link status inquiry. In this case, the ESME 202 inquires regarding the link between the ESME 202 and the SG 222. The SG 222 may send Enquire_Link to the MC $224_1$–$224_x$ to check the application level communications link between the SG 222 and the MC $224_1$–$224_x$. The MC $224_1$–$224_x$ responds with Enquire_Link_Resp. The ESME 202 may send Enquire_Link to the SG 222 to check the application level communications link between the ESME 202 and the SG 222. The SG 222 responds with Enquire_Link_Resp.

Figure 18:
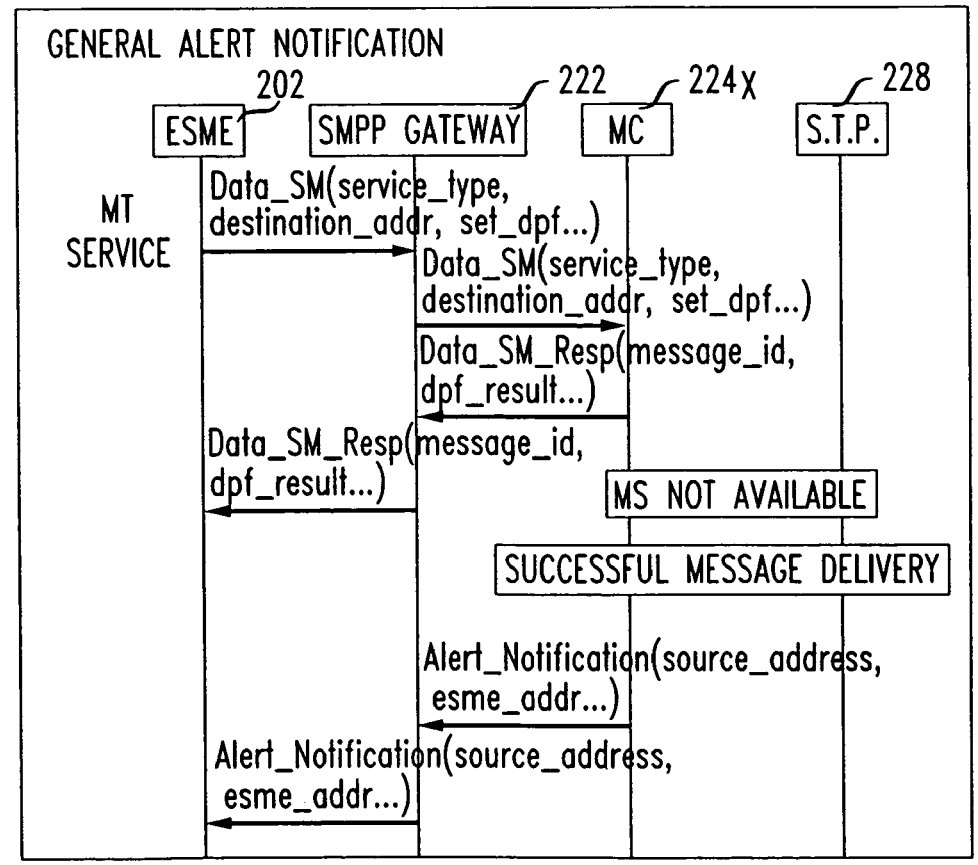
FIG. 18 shows an alert notification process.

FIG. 18 illustrates the alert notification protocol used by the MC to notify an ESME 202 that an MS 236 has become available. The ESME 202 sends a Data_SM signal to the SG 222 with set_dpf set for delivery failure request. The SG 222 routes Data_SM to destination MC $224_1$–$224_x$. The MC $224_1$–$224_x$ attempts message delivery. If the MS 236 is not available, the MC $224_1$–$224_x$ returns Data_SM_Resp to the SG 222 indicating the dpf_status. The SG 222 sends Data_SM_Resp to the ESME 202 indicating the dpf_status. At some later time, the MC $224_1$–$224_x$ successfully delivers the message to the MC $224_1$–$224_x$. The MC $224_1$–$224_x$ sends Alert_Notification to the SG 222 indicating dpf_status. The SG 222 routes Alert_Notification to the ESME 202 using the esme_addr parameter.

Figure 19:
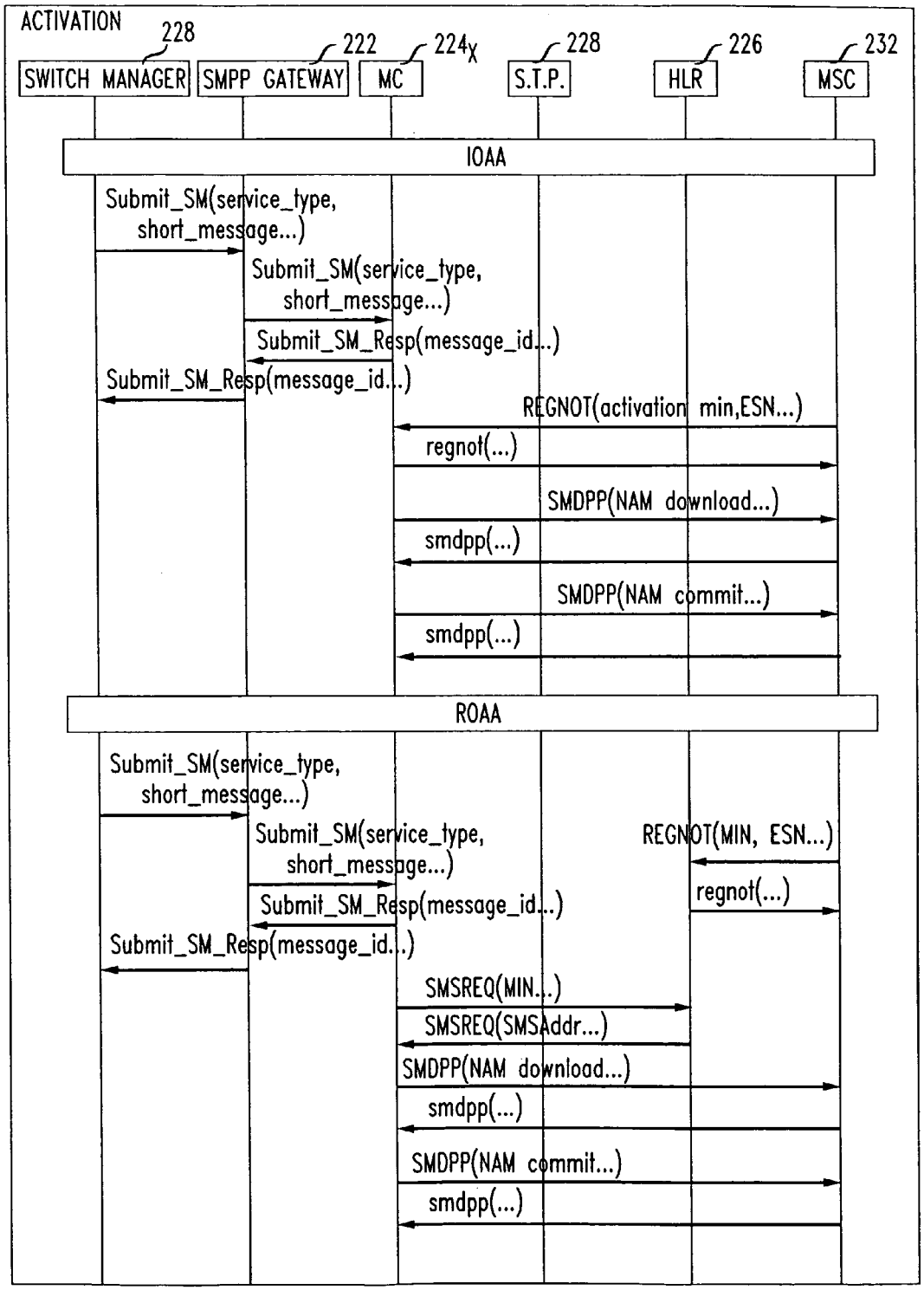
FIG. 19 illustrates an example of message flow for an activation process.

Over-the-air activation is also available with the introduction of the SG 222 into the messaging complex 216. FIG. 19 illustrates an example activation message flow according to the present invention. An OTAF sends a Submit_SM signal to the SG 222. The MS 236 number assignment module (NAM) data is contained in the short_message parameter. The NAM data associates the mobile identification number (MIN) with the electronic serial number (ESN). The destination_address parameter contains activation MIN. For an Initial Over the Air Activition (IOAA), the SG 222 extracts the electronic serial number (ESN) from the MS NAM data in the short_message parameter. The IOAA process refers to the first time a phone is activated over the air. During IOAA, parameters are downloaded to the phone allowing it to operate in the wireless network. For example, the phone receives its MDN (phone number) along with other parameters required for it to operate in the network.

Routing is based on odd or even ESN value. The SG 222 routes Submit_SM to the destination MC $224_1$–$224_x$ based on the ESN value. If an MC $224_1$–$224_x$ is not available, the SG 222 returns 'service not available' in command_status. The MC $224_1$–$224_x$ responds with Submit_SM_Resp with a unique message_id. The message_id can subsequently be used to query or cancel request from the OTAF. The SG 222 sends a Submit_SM_Resp signal to the OTAF. The MS 236 registers with activation MIN at the MC $224_1$–$224_x$. A REGNOT signal is routed to the MC $224_1$–$224_x$ by STP based on odd or even ESN value. Then IOAA can occur using existing procedures.

For the operation of reprogramming over-the-air-activation (ROAA), the OTAF sends a Submit_SM signal to the SG 222. The MS NAM data is contained in the short_message parameter. The destination_address parameter contains the MIN of the MS 236. Then the steps from the SG 222 extracting the ESN through the SG 222 sending the Submit_SM_Resp to OTAF signal are the same as the IOAA above.

The MC $224_1$–$224_x$ sends a SMSGEQ signal to the HLR 226. The HLR 226 responds with a SMSGEQ signal containing the SMS_Address. If the MS 236 is not registered, the standard delivery pending and SMSNOT procedures apply. Then, ROAA can be accomplished using existing procedures.

At the MC $224_1$–$224_x$ providing OTAP, RIP is set to 'replace' globally. Any pending activation (IOAA or ROAA) for a specific destination_address is replaced regardless of the RIP parameter in Submit_SM. The SG 222 must route IOAA and ROAA requests for the same MS 236 to the same MC $224_1$–$224_x$ so pending messages can be replaced if present. The RIP is based on destination_address. The Destination address is the activation MIN for IOAA and MIN for ROAA. Therefore, the SG 222 routing is based on ESN not MIN.

The SG 222 will have certain functions that it performs. These include security, anti-spam and flow control, and ESME-SG flow control. Regarding security issues, the ESMEs 202 will communicate with the SG 222 using dedicated network connections. The SG 222 is not connected to the Internet. The SG 222 implementation and communication with ESMEs 202 must meet established security requirements. The ESME 202 must be authorized to bind to the SG 222. Parameters for binding include System ID, specific socket, and password. The ESME 202 must be authorized to request delivery of a specific service type. The ESME 202 must be authorized for each service type it is allowed to delivery. An ESME 202 may be authorized to deliver more than one service type. If the ESME 202 requests delivery of a service type for which it is not authorized, the request will be rejected. Encryption of messages between ESME 202 and SG 222 should not be required.

Figure 20:
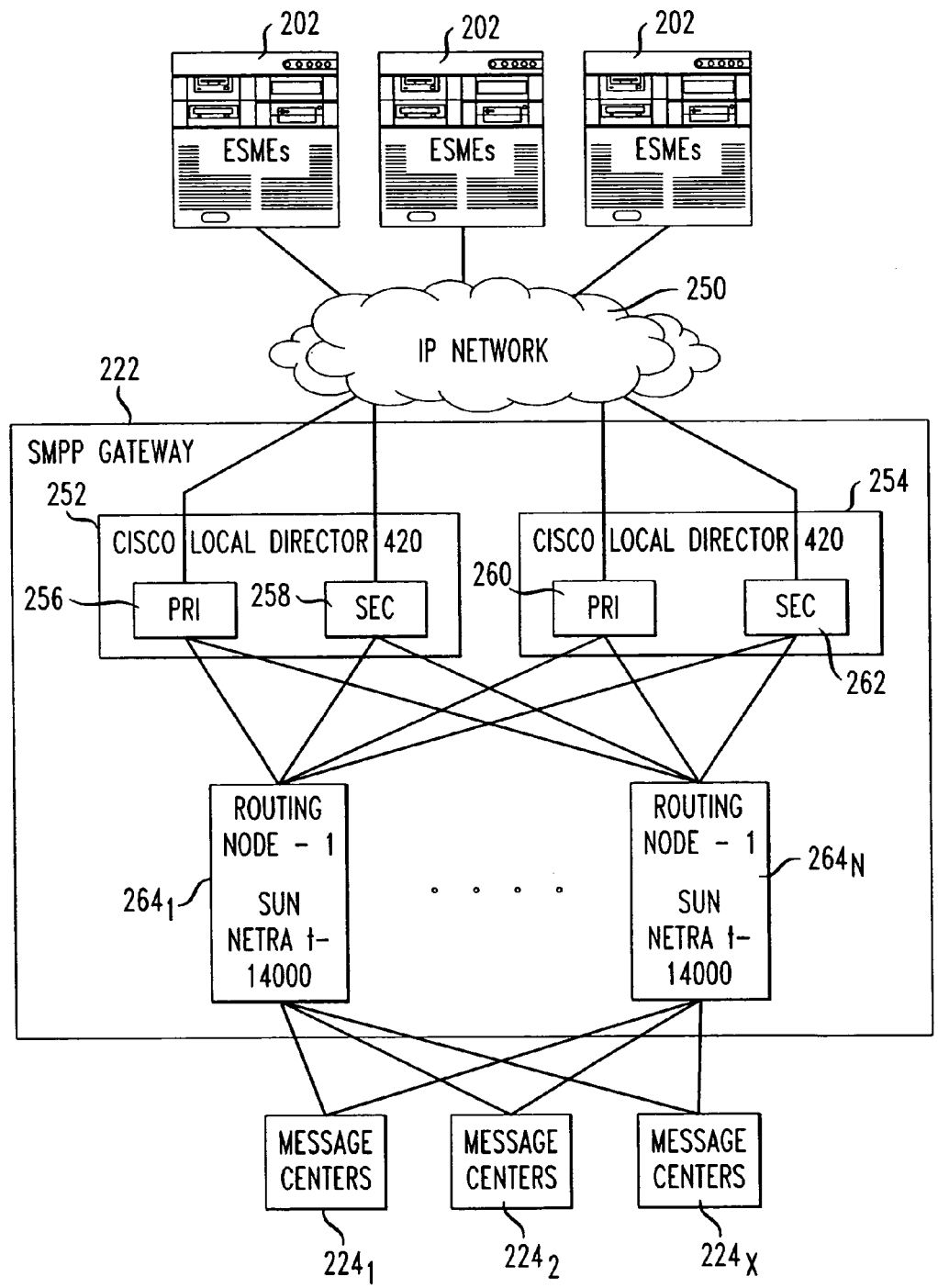
FIG. 20 shows an example of the hardware associated with the SMPP gateway.

Having discussed the various functions of the SG 222, we now turn to FIG. 20, wherein example hardware requirements for the SG 222 are disclosed. The main components of the SG 222 include at least one switch and at least one router. The ESMEs 202 transmit messages through an IP network 250 to the SMPP gateway 222. The SMPP gateway 222 comprises at least two routing servers, such as the Sun Microsystem Netra T 1400 Dual 440 MHz processor servers with 1 GB memory and two 18 GB disks. The SG 222 is scalable from 2 to n routing nodes $264_1$–$264_x$. Other more current computer servers may also be used and are contemplated as within the scope of the invention. Other features such as slots for removable media devices and other standard equipment are well known to those of skill in the art.

The servers control at least one and preferably two Cisco Local Director Routers 252, 254 as switches. Preferably, TCP/IP is the networking protocol to provide communication across the diverse networks. Each switch 252, 254 preferably contains a primary 256, 260 and a secondary 258, 262 component, respectively, for controlling the destination of each message received from the IP network 250. The destination of each message from the primary 256, 260 or secondary 258, 262 components of the switches 252, 254 is a first routing node 2641 or a second routing node 2642, up to "n" routing nodes. These routers are preferably Cisco Local Director Routers comprising LocalDirector 420, a four port 10/100 Ethernet card in a rack-mounted arrangement. The routers $264_1$, $264_2$ route the messages to the appropriate message center $224_1$, $224_2$, or $224_x$. While specific hardware components are mentioned as preferable, this is not meant to limit the general components to any type of router, computer server, or switch that performs the functions disclosed herein for the SG 222.

Although the above description may contain specific details, they should not be construed as limiting the claims in any way. Other configurations of the described embodiments of the invention are part of the scope of this invention. For example, the above description discusses messages being passed between an ESME and a wireless device. However, the SG may be modified to route messages between wireless carriers. Thus, messages may be passed from a subscriber of one wireless carrier to a subscriber of another carrier for both MO and MT messages. Accordingly, the appended claims and their legal equivalents should only define the invention, rather than any specific examples given.

We claim:

1. A method of delivering a message from a message source device to a message receiving device through a short message point-to-point protocol gateway through which plural short message entities communicate with a plurality of messaging centers, the method comprising:

transmitting a message from the message source device to the gateway, the message being associated with a message service type;

determining at the gateway a routing method based on the message service type; and routing the message from the gateway to one of the plurality of messaging centers according to the routing method, the routing method is selected from a group consisting of message center specific, load balancing, mobile destination number (MDN) range, equal allocation and electronic serial number, the equal allocation routing method routing messages to a group of message centers based on sequentially sending messages to each message center in the group of message centers such that each message center in the group receives an equal number of messages.

2. A method of delivering a message according to claim 1, wherein the message source device is one of a plurality of different message source devices that communicate with the gateway using a single interface protocol.

3. A method of delivering a message according to claim 1, wherein the message center specific routing method routes all messages for the message service type of the routed message to a specific messaging center.

4. A method of delivering a message according to claim 1, wherein the load balancing routing method routes messages to a group of message centers based on load capabilities of each message center in the group of message centers.

5. A method of delivering a message according to claim 1, wherein the MDN range routing method routes messages to a specific message center based on the MDN range of the destination address.

6. A method of delivering a message according to claim 5, wherein the MDN range routing method uses the message service type and destination address for routing decisions.

7. A method of delivering a message from a message source device to a message receiving device through a plurality of message centers communicating with a short message point-to-point protocol gateway, the method comprising:

transmitting the message from the message source device to one of the plurality of message centers, the message being associated with a message service type;

transmitting the message from the one of the plurality of message centers to the gateway;

determining at the gateway a routing method based on the message service type; and routing the message from the gateway to the message receiving device according to the routing method, the routing method being selected from a group consisting of message receiving device specific, load balancing, equal allocation, destination IP address, and destination address, wherein the destination address routing method routes the message to a destination message receiving device based on a value of a destination parameter.

8. A method of delivering a message according to claim 7, wherein the message source device is one of a plurality of different message source devices that communicate with the plurality of message centers using a single interface protocol.

9. A method of delivering a message according to claim 7, wherein the message receiving device specific routing method routes all messages for the message service type of the routed message to a specific messaging receiving device.

10. A method of delivering a message according to claim 7, wherein the load balancing routing method routes messages to a group of message receiving devices based on load capabilities of each message receiving device in the group of message receiving devices.

11. A method of delivering a message according to claim 7, wherein the equal allocation routing method routes messages to a group of message destination devices based on sequentially sending messages to each message receiving device in the group such that each message receiving device receives an equal number of messages.

12. A method of delivering a message according to claim 7, wherein the destination IP address routing method routes the message to a destination based on an IP address contained in a destination address parameter.

13. A method of processing mobile device terminated messages transmitted from a message source and received by a short message point-to-point protocol gateway through which plural short message entities communicate with a plurality of messaging centers, the messages being associated with a message service type, the method comprising:

invoking at the gateway a routing method based on the message service type, the routing method being invoked only if an anti-spamming check returns an allowed status;

routing the message from the gateway to a message center according to the invoked routing method; and transmitting the message from the message center to the mobile device, wherein the message center responds to the gateway to indicate that the message was received when the message center receives the message.

14. The method of claim 13, further comprising invoking the routing method only if a throttle control limit is not exceeded.

15. The method of claim 14, further comprising transmitting an alarm when the message is rejected and the message source throttle limit is exceeded.

16. The method of claim 15, further comprising transmitting an alarm when the message is rejected and a message center is not available for the service type associated with the message.

17. The method of claim 13, further comprising sending to the message source a response signal indicating that the message was received by the message center when the gateway receives the response signal from the message center.

18. A method of processing a mobile device terminated (MT) message transmitted from a message source and received by a gateway, the MT message being associated with a service type, the method comprising:

determining whether the message source is bound to the gateway;

rejecting the MT message if the message source is not bound to the gateway;

determining whether the message source is authorized for the service type if the message source is bound to the gateway;

rejecting the MT message if the message source is not authorized for the service type;

determining whether throttle control limits are exceeded for the message source if the message source is authorized for the service type;

rejecting the MT message if throttle control limits are exceeded;

determining whether anti-spamming is enabled for the service type if throttle control limits are not exceeded;

requesting an anti-spam check if anti-spamming is enabled;

invoking a routing method for the service type if the anti-spam check returns allowed;

rejecting the MT message if the anti-spam check returns not allowed;

invoking a routing method for the service type if anti-spamming is not enabled for the service type;

determining whether a message center is available for the service type;

rejecting the message if no message center is available;

routing the message to a destination message center if a message center is available;

receiving a response from the destination message center; and transmitting the response to the message source.

19. The method of claim 18, further comprising:

if a message center is available for the service type associated with the MT message, determining whether the message center is subject to flow control and whether an alternate message center is available; and rejecting the message if the message center is subject to flow control and no alternate message center is available.

20. The method of claim 18, further comprising:

after the gateway receives a response from the destination message center, determining whether the response indicates congestion;

determining whether an alternate message center is available if congestion exists;

if an alternate message center is available when congestion exists, routing the message to the alternate destination message center;

if no alternate message center is available, invoking flow control at the destination message center and rejecting the message; and sending the response to the message source if no congestion exists.

* * * * *